(12) United States Patent
Mizrahi

(10) Patent No.: US 11,357,359 B2
(45) Date of Patent: Jun. 14, 2022

(54) PORTABLE BLENDER SET

(71) Applicant: Enegi Brands Inc., Brooklyn, NY (US)

(72) Inventor: Mike J. Mizrahi, Brooklyn, NY (US)

(73) Assignee: ENEGI BRANDS INC., Brooklyn, NY (US)

( * ) Notice: Subject to any disclaimer, the term of this patent is extended or adjusted under 35 U.S.C. 154(b) by 30 days.

(21) Appl. No.: 16/503,138

(22) Filed: Jul. 3, 2019

(65) Prior Publication Data

US 2019/0343334 A1 Nov. 14, 2019

Related U.S. Application Data

(62) Division of application No. 15/365,897, filed on Nov. 30, 2016, now Pat. No. 10,362,903.

(51) Int. Cl.
*A47J 43/00* (2006.01)
*A47J 43/042* (2006.01)

(52) U.S. Cl.
CPC .................. *A47J 43/042* (2013.01)

(58) Field of Classification Search
CPC .............................. A47J 43/042; A47J 43/046
See application file for complete search history.

(56) References Cited

U.S. PATENT DOCUMENTS

| 2,300,605 | A | | 11/1942 | Wilcox |
| 3,931,494 | A | | 1/1976 | Fisher et al. |
| 4,095,090 | A | * | 6/1978 | Pianezza ............ A47G 19/2288 |
| | | | | 219/435 |
| 4,335,860 | A | | 6/1982 | Grandel et al. |

(Continued)

FOREIGN PATENT DOCUMENTS

| CN | 102647931 A | 8/2012 |
| EP | 1493370 A1 | 1/2005 |

(Continued)

OTHER PUBLICATIONS

Ninja Professional Blender BI500 Owner's Guide; Euro-Pro Operating LLC; Feb. 23, 2011; 8 pages.

(Continued)

*Primary Examiner* — Anshu Bhatia
(74) *Attorney, Agent, or Firm* — Quarles & Brady LLP

(57) ABSTRACT

A portable blender includes a handle having at least one first attachment structure, an activation button, and a power activation member positioned for mechanical engagement with the activation button and a power switch. The blender also includes a container body with at least one second attachment structure. The first attachment structure and second attachment structure are configured to engage each other to attach the handle to the container body and to disengage each other to detach the handle from the container body. The blender further includes a container base configured for detachable engagement with the container body. In one configuration, the blender set includes a motor subunit configured for detachable engagement with the container base, and a power subunit configured for detachable engagement with the motor subunit. In another configuration, the blender includes a motor subunit configured for detachable engagement with the container base, and a power subunit included in the handle.

15 Claims, 26 Drawing Sheets

(56) References Cited

U.S. PATENT DOCUMENTS

| | | | |
|---|---|---|---|
| 4,435,084 A | 3/1984 | Calhoun et al. | |
| 4,487,509 A | 12/1984 | Boyce | |
| 5,222,430 A | 6/1993 | Wang | |
| 5,425,579 A | 6/1995 | Sampson | |
| 5,639,161 A | 6/1997 | Sirianni | |
| 6,010,030 A | 1/2000 | St. John et al. | |
| 6,554,466 B1 * | 4/2003 | Lee | A47J 43/046 241/37.5 |
| 6,568,843 B1 | 5/2003 | Lai | |
| 6,629,492 B1 | 10/2003 | Li | |
| 6,637,681 B1 | 10/2003 | Planca et al. | |
| 7,314,307 B2 | 1/2008 | Cai | |
| 7,364,348 B1 | 4/2008 | Jones | |
| 7,384,182 B2 * | 6/2008 | Bhavnani | A47J 43/046 366/130 |
| 7,407,320 B1 | 8/2008 | Lin | |
| 7,422,362 B2 | 9/2008 | Sands | |
| 7,615,724 B2 | 11/2009 | Labelle et al. | |
| 8,403,556 B2 | 3/2013 | Wu | |
| 9,039,274 B1 | 5/2015 | Corda | |
| 2001/0036124 A1 | 11/2001 | Rubenstein | |
| 2005/0207273 A1 | 9/2005 | Newman et al. | |
| 2006/0176770 A1 * | 8/2006 | Sands | A47J 43/0716 366/205 |
| 2011/0248108 A1 | 10/2011 | Carriere | |
| 2012/0175444 A1 | 7/2012 | Oblak et al. | |
| 2014/0301155 A1 | 10/2014 | Montgomery | |

FOREIGN PATENT DOCUMENTS

| | | |
|---|---|---|
| EP | 1731068 A1 | 12/2006 |
| KR | 101490099 B1 | 2/2015 |
| WO | 2011067532 A1 | 7/2011 |

OTHER PUBLICATIONS

International Search Report & Written Opinion for related application PCT/US/2016/064288; dated Nov. 3, 2017; 17 pages.

Deshayes et al. Google Patents Translation of WO2011/067532 A. Google Patents. pp. 1-4. (Year: 2011).

* cited by examiner

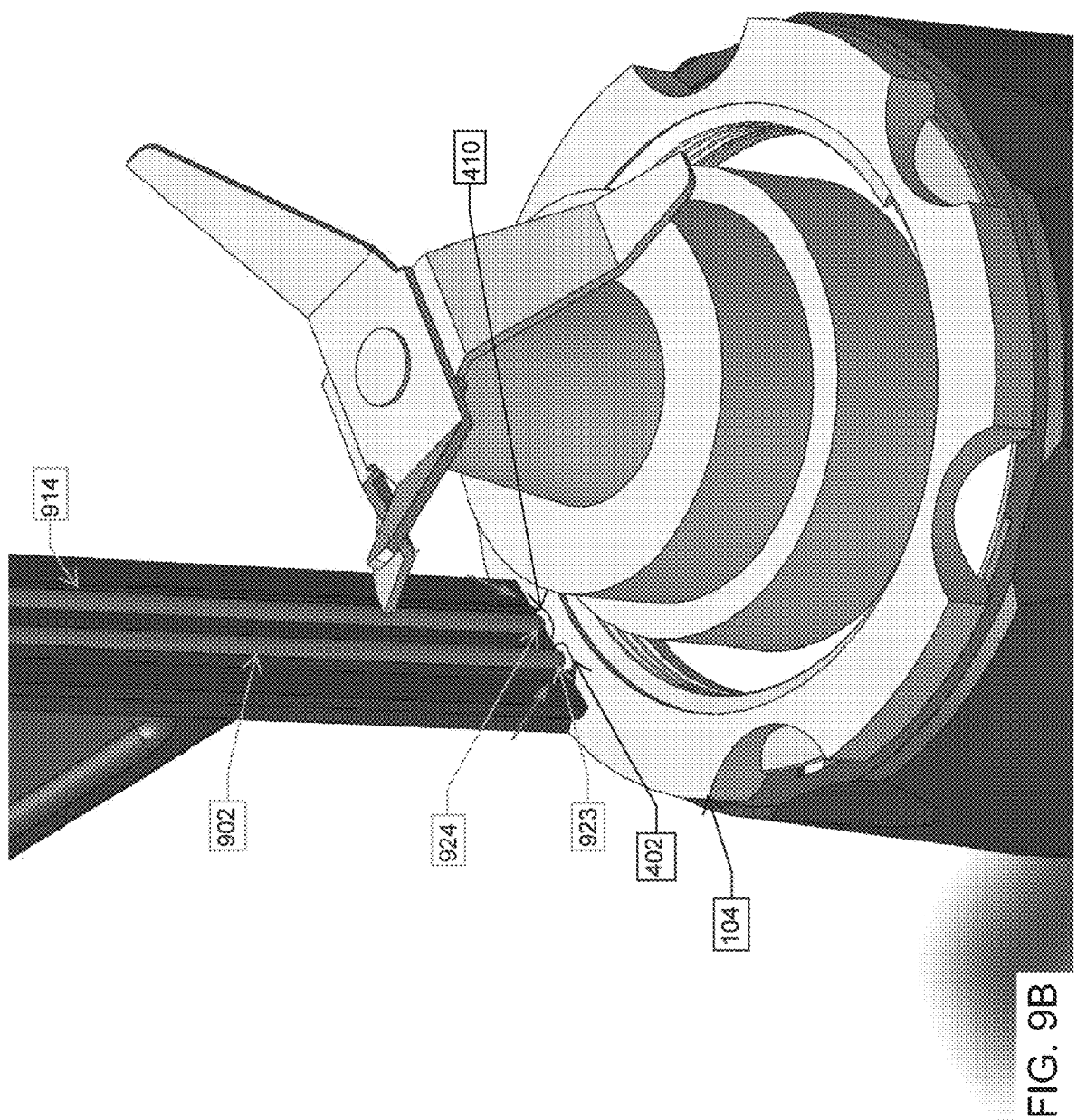

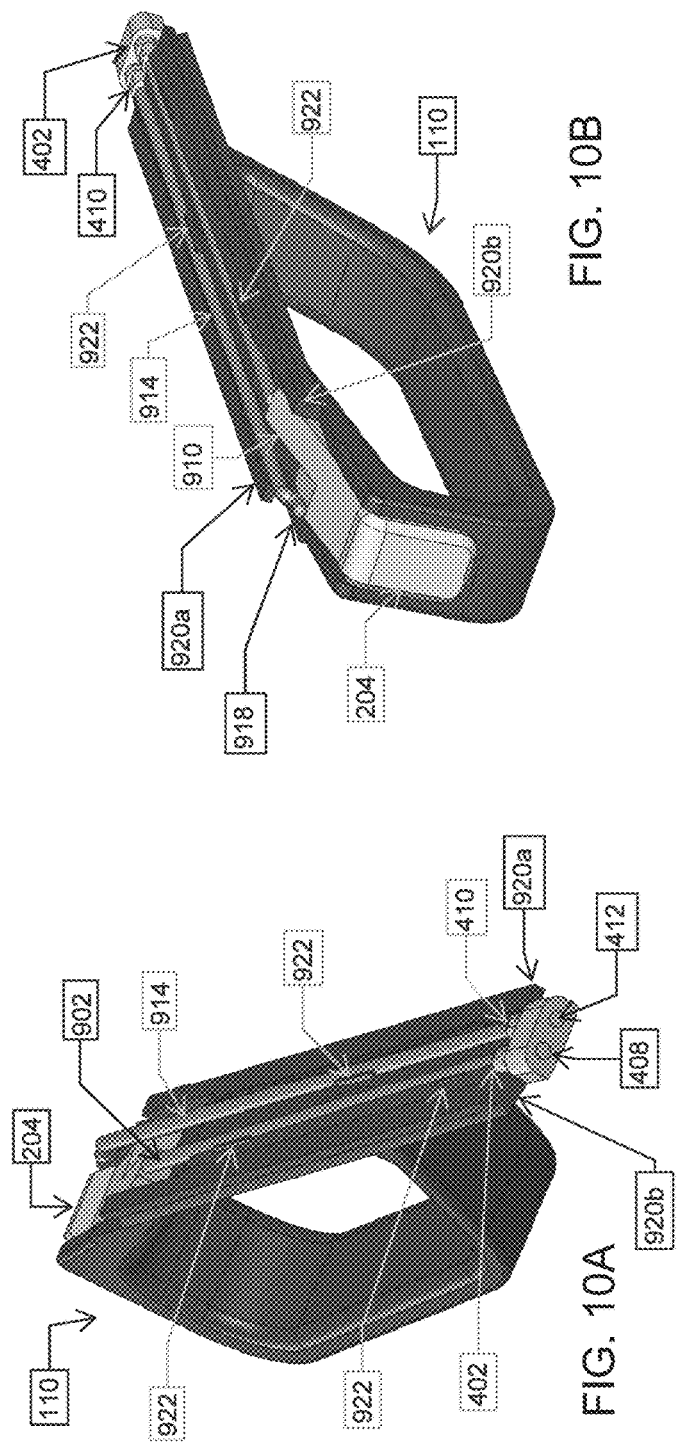
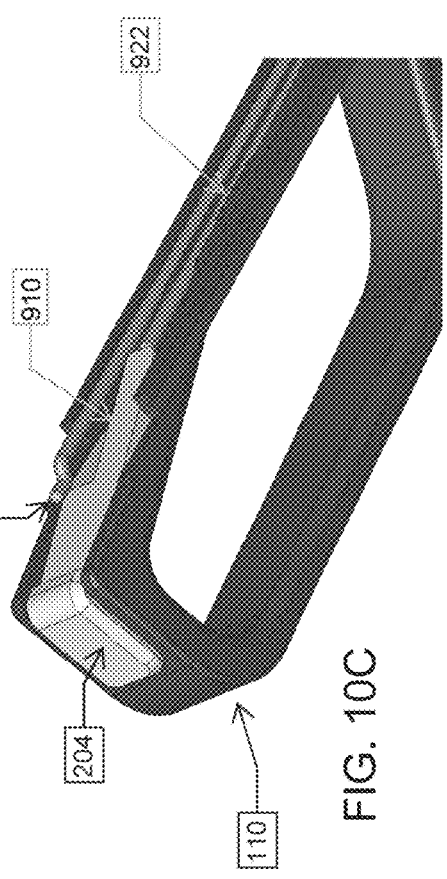
FIG. 10A
FIG. 10B
FIG. 10C

US 11,357,359 B2

PORTABLE BLENDER SET

PRIORITY CLAIM

This application is a divisional application of utility patent application Ser. No. 15/365,897 filed in the United States Patent and Trademark Office on Nov. 30, 2016, the entire content of which is incorporated herein by reference as if fully set forth below in its entirety and for all applicable purposes.

TECHNICAL FIELD

The present disclosure relates generally to appliances for mixing food items into beverages, and more particularly, to a portable blender set that includes various components that may be assembled to form different configurations of blenders, each adaptable for portable use.

BACKGROUND

Traditional blenders are large, heavy kitchen appliances that are powered through a connection to an electrical power outlet. Because of these physical characteristics and electrical power requirements, traditional blenders are not easily transportable and have limited use outside of the kitchen environment. Furthermore, traditional blenders are not modular in nature. That is, they cannot be disassembled and reassembled into different configurations appropriate for different uses or users.

It would be desirable to have a compact, lightweight, easily transportable blender that is capable of operating independent of an electrical power outlet. It would also be desirable to have a compact, lightweight, easily transportable blender that is capable of being assembled into different configurations. Embodiments of such a portable blender are described herein.

BRIEF DESCRIPTION OF THE DRAWINGS

Some embodiments of the apparatus and/or methods in accordance with embodiments of the disclosure are now described, by way of example only, and with reference to the accompanying drawings, in which like reference numerals identify similar components throughout:

FIG. 3 is from a perspective showing the top of the motor-power unit, while FIG. 4 is from a perspective showing the bottom of the container unit.

FIG. 5 is from a perspective showing the top of the power subunit, while FIG. 6 is from a perspective showing the bottom of the motor subunit.

FIGS. 9A and 9B are illustrations of the portable blender of FIG. 2, from different perspectives and with the container body not shown to illustrate components that control the operation of the blender.

FIGS. 10A, 10B, and 10C are illustrations of components associated with the detachable handle of FIG. 2 that control the operation of the blender.

SUMMARY

Figure 1:
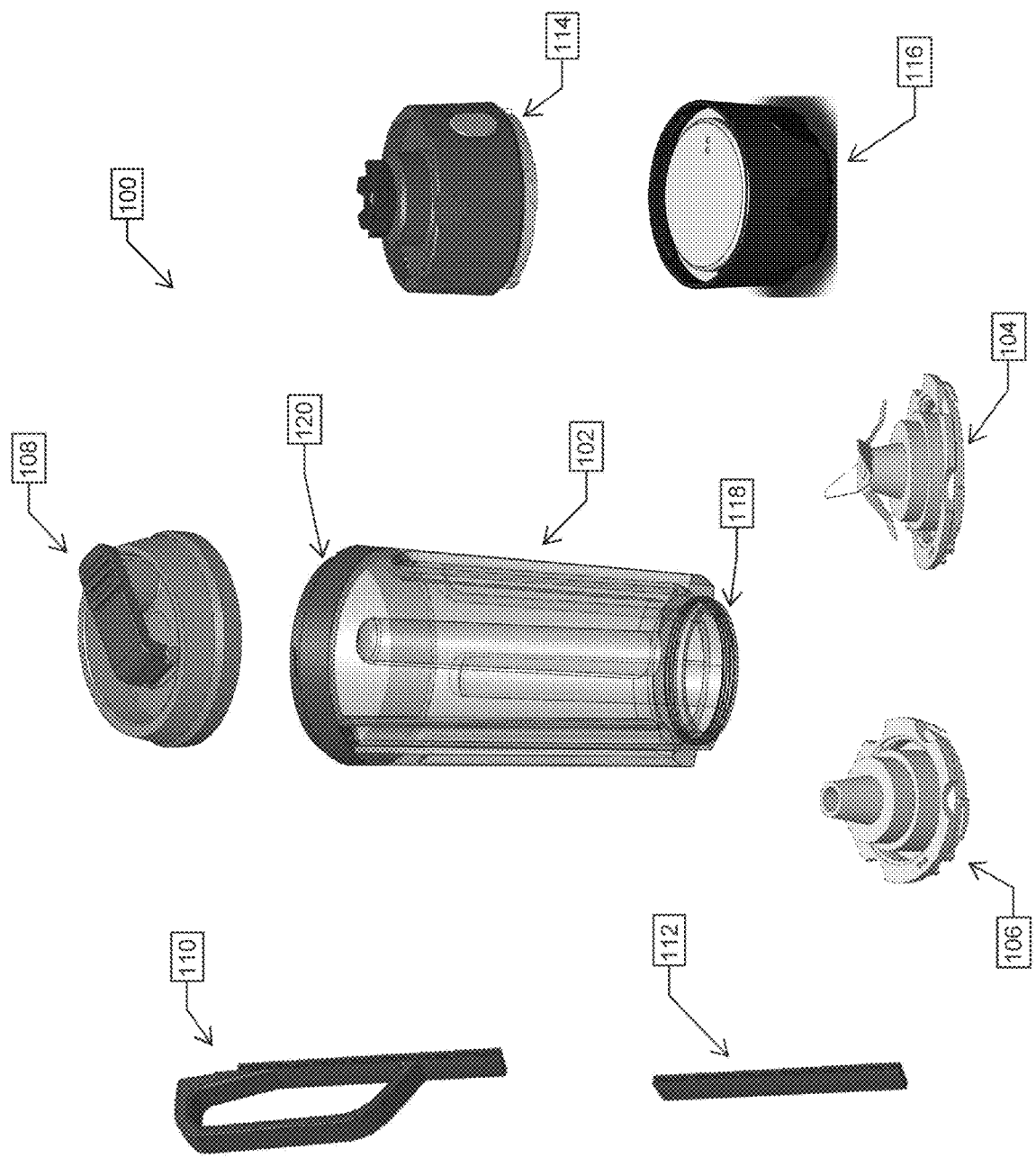
FIG. 1 is an illustration of various components of a portable blender set, which may be assembled to form various configurations of a portable blender.

The following presents a simplified summary to provide a basic understanding of some exemplary embodiments. This summary is not an extensive overview and is not intended to identify key or essential elements or delineate the scope of the embodiments disclosed throughout the present Specification and its appended Claims.

In one embodiment, a portable blender set includes a handle having at least one first attachment structure, an activation button, and a power activation member positioned for mechanical engagement with each of the activation button and a power switch. The blender set also includes a container body with at least one second attachment structure. The at least one first attachment structure and at least one second attachment structure are configured to engage each other to attach the handle to the container body and to disengage each other to detach the handle from the container body. The blender set further includes a container base configured for detachable engagement with the container body. In one configuration, the blender set further includes a motor subunit configured for detachable engagement with the container base, and a power subunit configured for detachable engagement with the motor subunit. In this configuration, the motor subunit includes the power switch and attachment of the handle through engagement of the first attachment structure and the second attachment structure positions, e.g., aligns, the power activation member for mechanical engagement with the power switch through one or more intervening mechanical structures included in one or more of the container base and the motor subunit. In another configuration, the blender set further includes a motor subunit configured for detachable engagement with the container base, and a power subunit that is included in the handle. In this configuration, the handle includes the power switch and attachment of the handle through engagement of the first attachment structure and the second attachment structure establishes an electrical engagement, e.g., interconnection, between the power subunit and the power switch in the handle and the motor subunit.

In another embodiment, a portable blender includes a motor-power unit that includes a power switch configured to transition between an on state during which the blender is on, and an off state during which the blender is off. The on state of the power switch may correspond to the switch being closed, while the off state may correspond to the switch being opened. The blender further includes a container unit removably coupled to the motor-power unit. The container unit includes a detachable handle with a handle activation button configured to transition between a first state and a second state, and a power activation member aligned for mechanical engagement with the handle activation button at a first end and the power switch at a second end. The first state of the handle activation button may correspond to the button being pressed, while the second state may correspond to the button being released. The mechanical engagement of the power activation member with the power switch and the handle activation button is such that a transition of the handle activation button from the first state to the second state causes a transition of the power switch. For example, a transitioning of the handle activation button from a released state to a pressed state may cause the power activation member to close the power switch to thereby turn the blender on. A subsequent transitioning of the handle activation button from a released state to a pressed state may cause the power activation member to open the power switch to thereby turn the blender off.

In yet another embodiment, a portable blender includes a power subunit unit, a motor subunit, and a container unit removably coupled to the motor subunit. The container unit includes a container body and a detachable handle removably coupled to the container body. The portable blender further includes a power safety mechanism at least partially associated with the container unit, and a power activation mechanism that is also at least partially associated with the container unit. The power safety mechanism, which may include a safety switch and one or more mechanically engageable structures, is configured to transition between an enabled state during which the blender may be turned on, and a disabled state during which the blender cannot be turned on. To this end, the one or more mechanically engageable structures may be arranged to engage the safety switch to toggle the safety switch between open and closed states. The power activation mechanism, which may include a power activation button, a power switch, and one or more mechanically engageable structures, is configured to transition between an on state during which the blender in on, provided the power safety mechanism is in the enabled state, and an off state during which the blender is off. To this end, the power activation button and the one or more mechanically engageable structures may be arranged to engage the power switch to toggle the power switch between open and closed states.

DETAILED DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein. The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments, and are to be construed as being without limitation to such specifically recited examples and conditions. Moreover, all statements herein reciting principles, aspects, and embodiments, as well as specific examples thereof, are intended to encompass equivalents thereof.

In the context of the present specification, when an element is referred to as being "on" another element, it can be directly on the other element or be indirectly on the other element with one or more intervening elements interposed there between. Also, in the context of the present specification, when an element is referred to as being "connected" or "coupled" or "attached" to another element, it can be directly connected or coupled or attached to the other element or be indirectly connected or coupled or attached to the other element with one or more intervening elements interposed there between. Also, when an element is referred to as being in "engagement" with another element, it can be in direct engagement or contact with the other element, or in indirect engagement or contact with the other element with one or more intervening elements interposed there between.

As stated above, traditional blenders are large, heavy kitchen appliances that are powered through a connection to an electrical power outlet. Because of these physical characteristics and electrical power requirements, traditional blenders are not easily transportable and have limited use outside of the kitchen environment. Disclosed below is a blender set that includes various parts that may be selected and assembled to form different configurations of a portable blender. Each of which is compact, lightweight, easily transportable, and capable of operating independent of an electrical power outlet.

FIG. 1 is an illustration of various components of a portable blender set 100, which may be selected and assembled to form various configurations of a portable blender. For description purposes, the components of the portable blender set 100 may be separated into different groups based on their functionality. To that end, those components of the portable blender set of FIG. 1 that generally function to contain or hold food items are referred to as "container components", while those components related to the operation of the blender are referred to as "power components."

Figure 2:
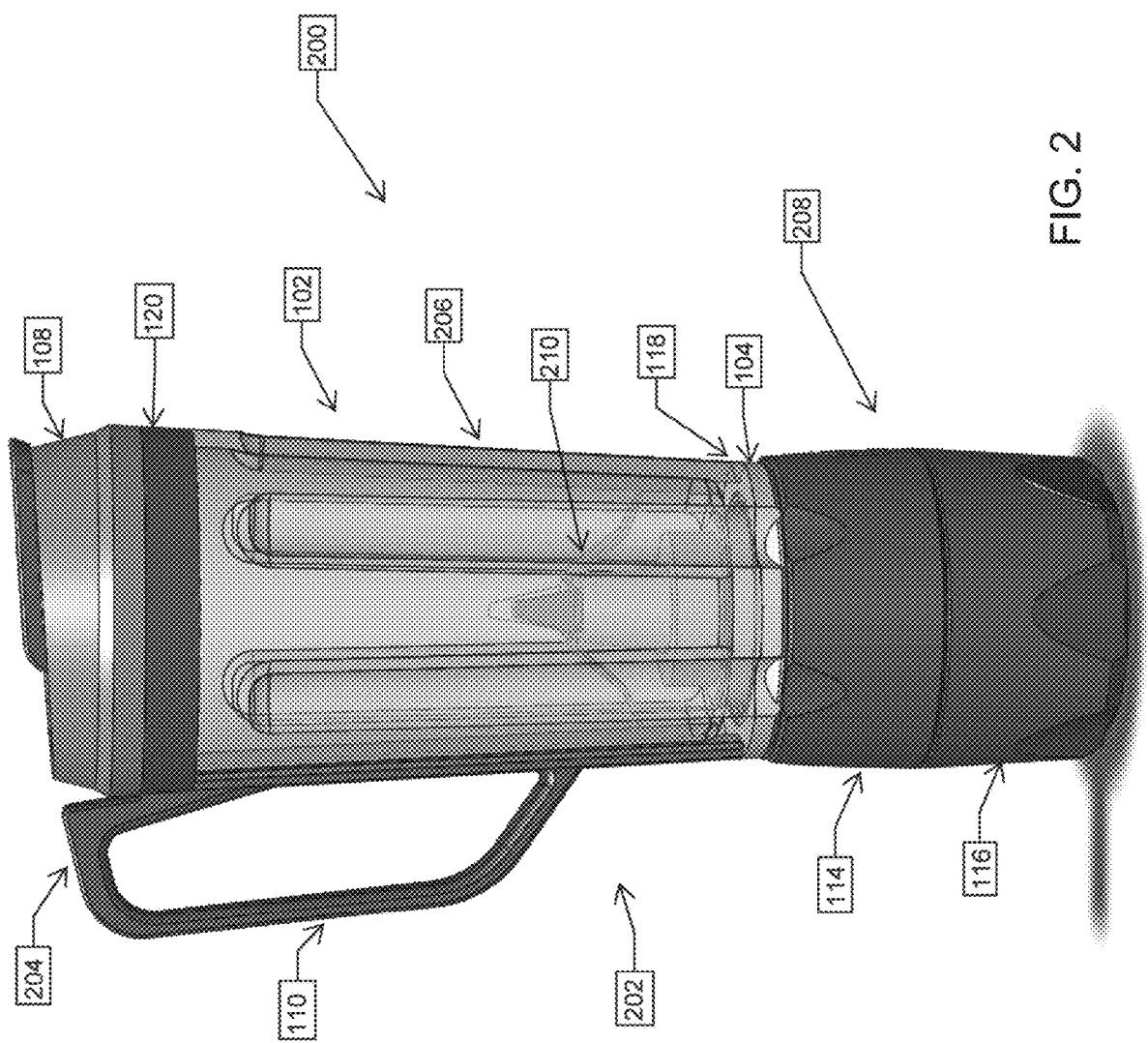
FIG. 2 is an illustration of a portable blender assembled from components of the portable blender set of FIG. 1, which includes a container unit and a motor-power unit which are detachable from each other, wherein the container unit has a detachable handle.
Figure 18:
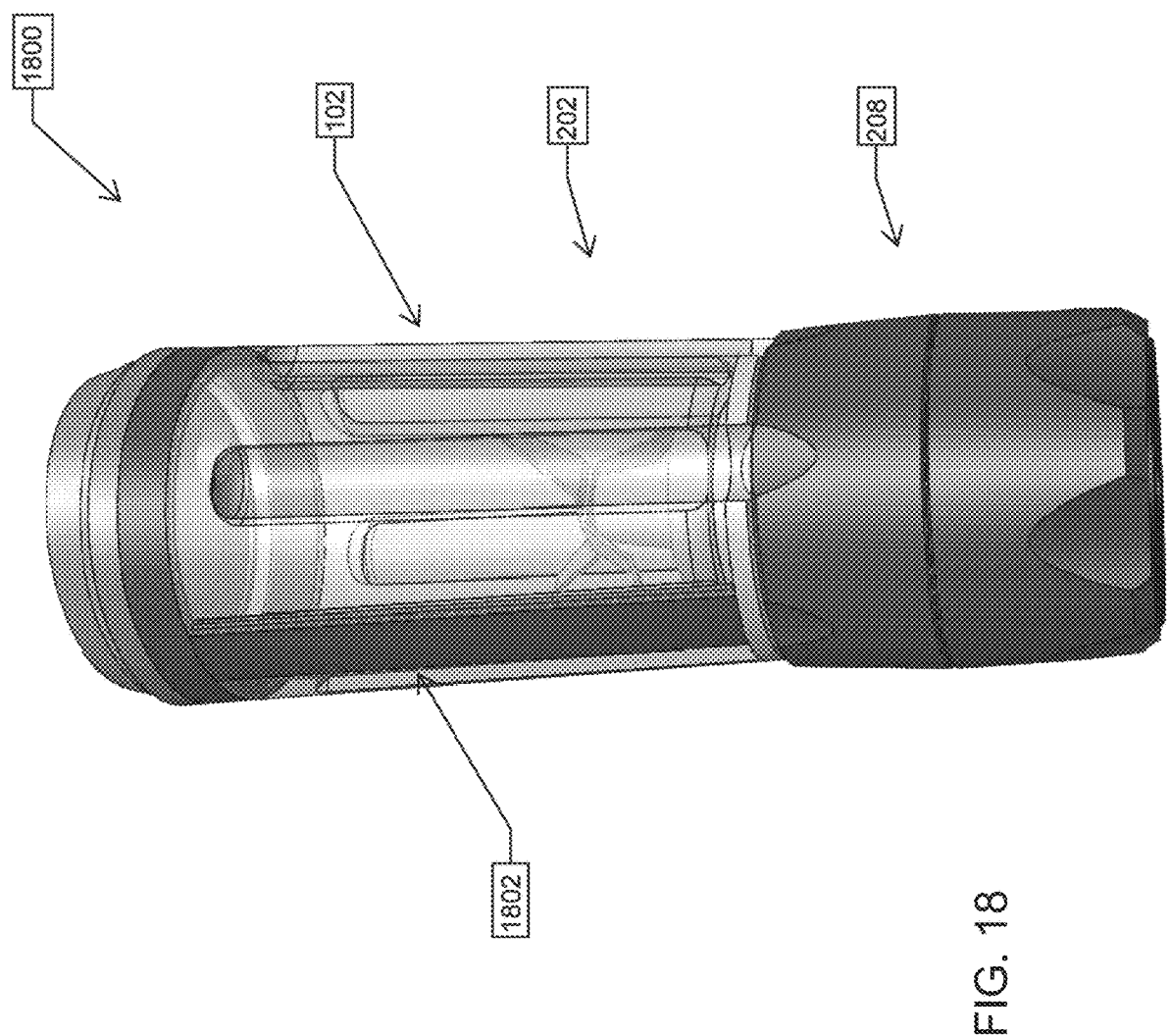
FIG. 18 is an illustration of a portable blender assembled from the components of the portable blender set of FIG. 1, which includes a container unit and a motor-power unit which are detachable from each other, wherein the container unit has a detachable insert in place of a handle.

The container components include a container body 102, a bladed container base 104, a bladeless container base 106, a lid 108, a handle 110, and an insert 112. These components of the portable blender set 100 may be assembled to form different configurations of a container unit for holding food items for processing. For example, as shown in FIG. 2, a container unit 202 having a handle 110 may be assembled if the user of the blender set would find it convenient to have a handle with which to hold the container unit. Alternatively, as shown in FIG. 18, a container unit 202 having insert 112 in place of a handle may be assembled if the user of the blender set would prefer to hold the container unit by gripping the container body 102. In other variations, the container unit 202 may include a bladed container base 104 for purposes of blending bulky food items, such as fruits, vegetables, and ice, into a beverage. Alternatively, the container unit 202 may include a bladeless container base 106 for purposes of mixing or stirring a beverage. In one example embodiment, the assembled container unit 202 has a diameter at the top of approximately 3.25 inches, a diameter at the top of approximately 2.75 inches, a height of approximately 7 inches, and a capacity of about 16.5 fluid ounces.

The container components of the portable blender set 100 are easily assembled through rotational coupling or press fitting. To this end, each of the bladed container base 104 and the bladeless container base 106 include a threaded region that may be mechanically coupled to a complementary threaded region at the bottom 118 of the container body 102. The container base 104, 106 and container body 102, are secured together by rotation to form a seal (e.g., a watertight seal) between the components. The lid 108 may be mechanically coupled to the top 120 of the container body 102 by press fitting or rotational coupling. Details of the components of the container unit 202 are further described below with reference to FIGS. 7 and 8.

Continuing with FIG. 1, the power components of the portable blender set 100 include a motor subunit 114 and a power subunit 116. These components of the portable blender set 100 may be assembled to form a motor-power unit for operating the portable blender. An example of a motor-power unit 208 is shown in FIG. 2. In one example embodiment, the motor-power unit has a maximum diameter of approximately 3.0 inches and a height of approximately 3.2 inches. These dimensions allow for the motor-power unit 208 to fit in a standard sized cup holder of an automobile.

The power components of the portable blender set 100 are easily assembled through rotational coupling. To this end, the motor subunit 114 may be mechanically coupled to the power subunit 116 by rotation and interlocking of respective interlocking members. The motor subunit 114 and power subunit 116 include electrical contacts that are electrically coupled upon mechanical coupling of the motor subunit 114 and the power subunit 116. The electrical coupling provides power from the power subunit 116 to a motor of the motor subunit 114. The interlocking members and electrical contacts of these components are further described below with reference to FIGS. 5 and 6.

FIG. 2 is an illustration of a portable blender 200 assembled from the components of the portable blender set 100 of FIG. 1, to form a blender that includes a container unit 202 with a handle 110 and a bladed container base 104. The handle 110 includes an activation button 204 that is mechanically coupled with a power activation member (not shown) that extends along the sidewall 206 of the container body 102. The power activation member, in turn, is mechanically coupled with a power switch of the motor-power unit 208 for turning the blender on and off. The configuration and operation of the handle activation button 204, the power activation member, and the power switch are further described below with reference to FIGS. 9-13. The bladed container base 104 includes a blade mixer 210 for blending or mixing food.

Figure 3:
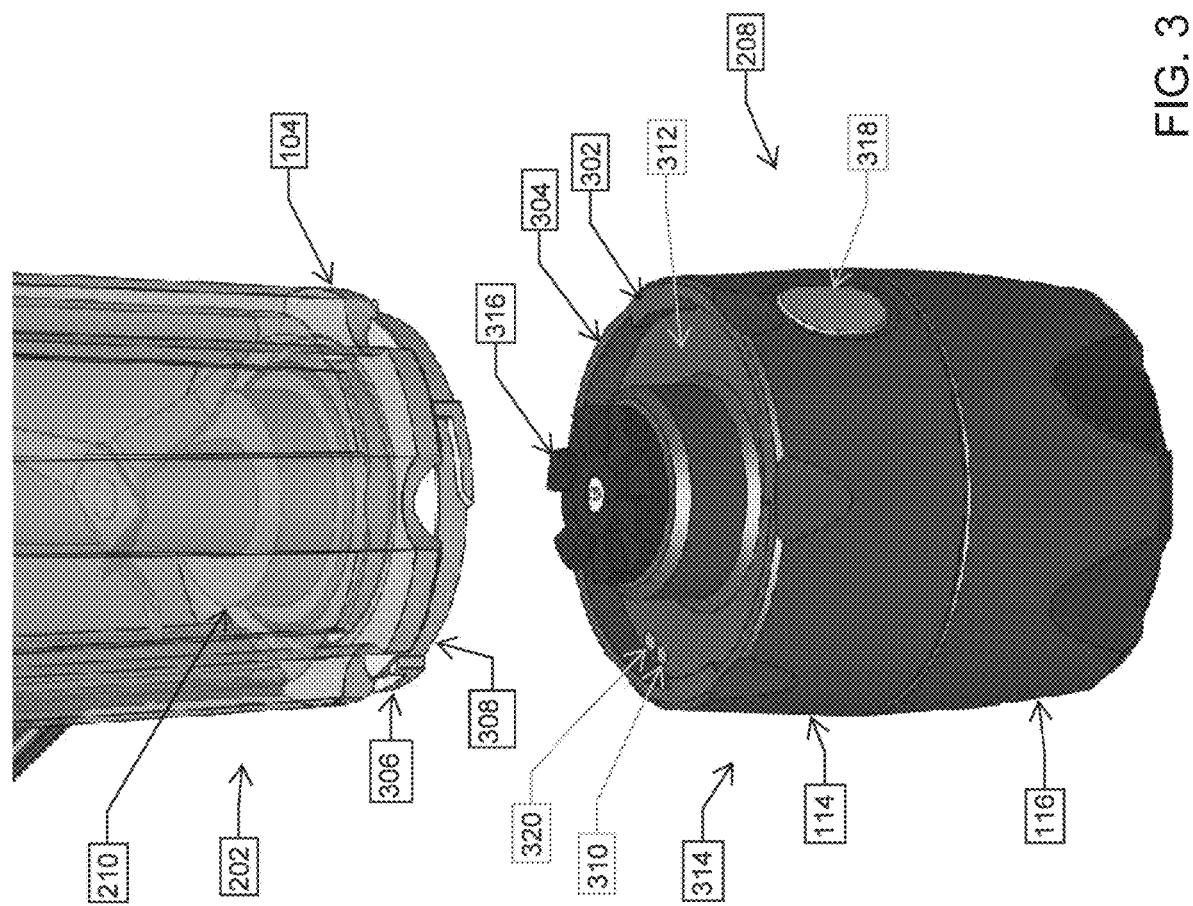
FIGS. 3 and 4 are illustrations of the lower portion of the portable blender of FIG. 2, with the motor-power unit detached from the container unit.
Figure 4:
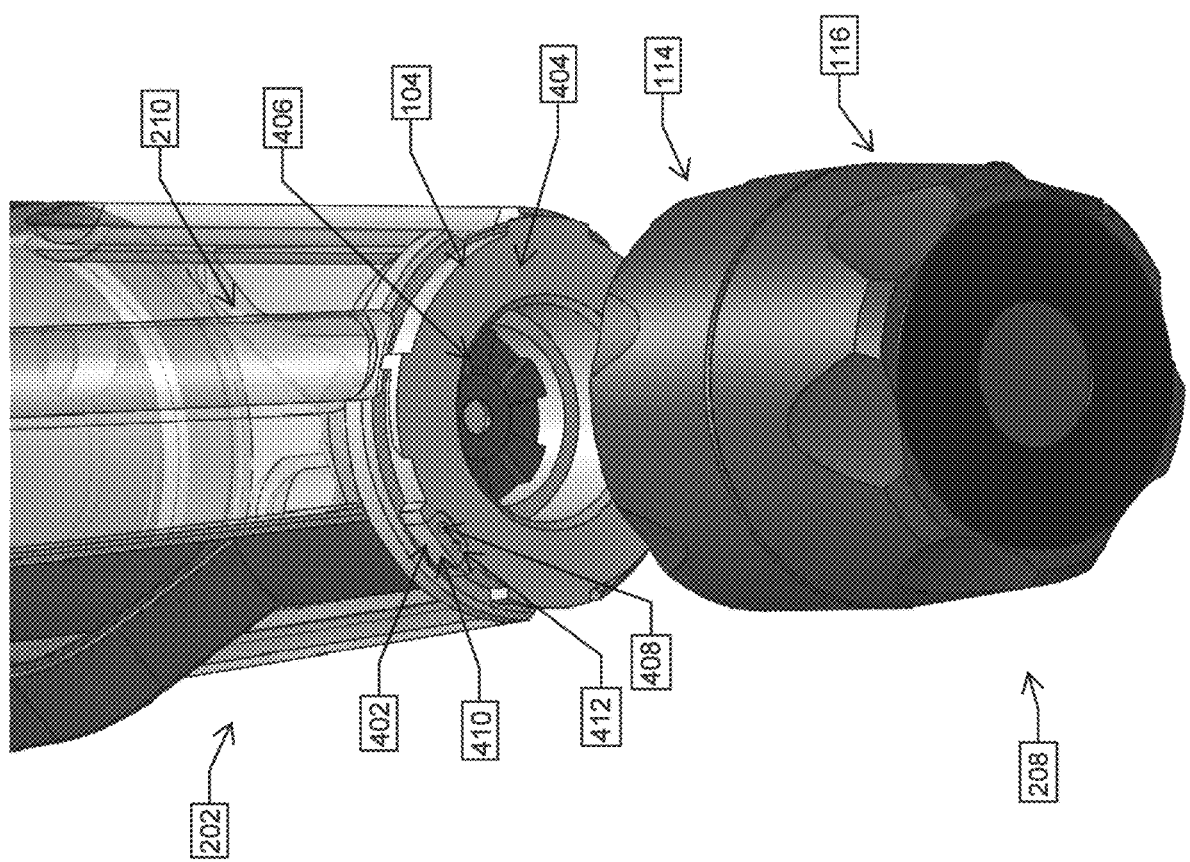

FIGS. 3 and 4 are illustrations of the lower portion of the portable blender 200 of FIG. 2, with the motor-power unit 208 detached from the container unit 202. FIG. 3 is from a perspective showing the top of the motor-power unit 208, while FIG. 4 is from a perspective showing the bottom of the container unit 202. With reference to FIG. 3, the motor subunit 114 includes several interlocking members 302 positioned around the upper perimeter 304 of the motor subunit. The bladed container base 104 includes a corresponding number of interlocking members 306 positioned around the perimeter 308 of the bladed container base. The respective interlocking members 302, 306 are configured to engage each other upon rotational assembly of the container unit 202 and the motor-power unit 208 to thereby secure the units together.

With continued reference to FIG. 3, the top of a mechanical structure, referred to as a power switch rod 310, is exposed at the top surface 312 of the motor subunit 114. The power switch rod 310 extends through the top of the housing 314 of the motor subunit 314 and aligns with a power switch (not shown) of motor subunit 114. The top of a mechanical structure, referred to as a safety switch rod 320, may also be exposed at the top surface 312 of the motor subunit 114. The safety switch rod 320 extends through the top of the housing 314 of the motor subunit 314 and aligns with a safety switch (not shown) of motor subunit 114. The interaction and operation of the power switch rod 310 and the power switch, and the safety switch rod 320 and the safety switch are further described below with reference to FIGS. 11-13.

Figure 11:
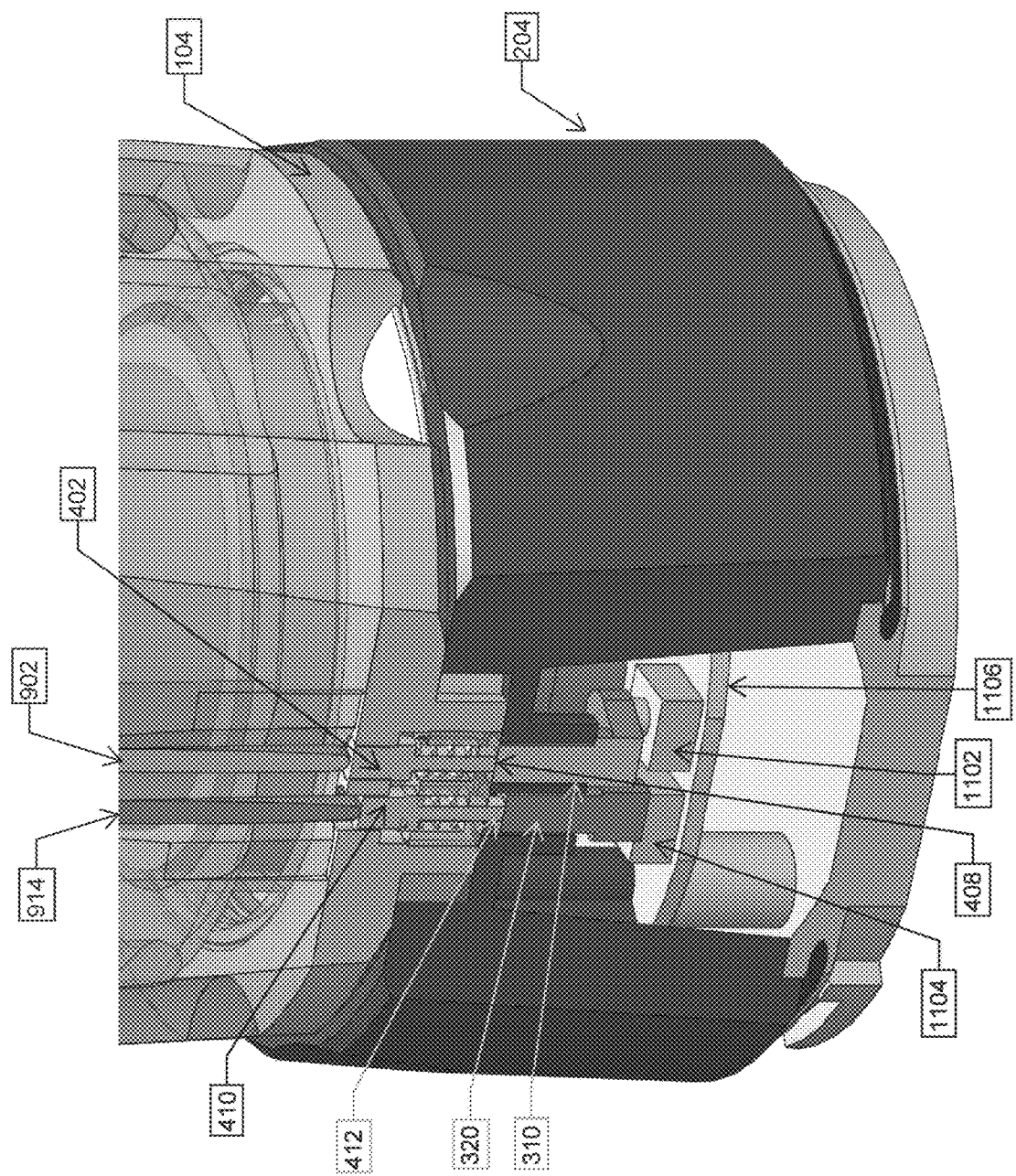
FIG. 11 is an illustration of components associated with the container unit and the motor-power unit of FIG. 2 that control the operation of the blender.

With reference to FIG. 4, a mechanical structure, referred to as a power push pin 402, extends through a hole (not shown) in the container base 104. The power push pin 402 is surrounded by a spring (not shown in FIG. 4, but is shown in FIG. 11) and is configured to transition between an extended position where a tip portion 408 of the power push pin projects downward from the bottom 404 of the container base, and a retracted position where the tip portion 408 is substantially flush with the bottom 404 of the container base. The power push pin 402 is positioned along the perimeter of the bottom 404 of the container base 104, such that upon complete rotational engagement of the container unit 202 and the motor-power unit 208, the tip portion 408 of the power push pin is aligned with the top of the power switch rod 310 of the motor subunit 114.

When the power push pin 402 and power switch rod 310 are aligned, the tip portion 408 of the power push pin is positioned adjacent to the power switch rod, and is thus capable of engaging the power switch rod. The power push pin 402 may have an associated biasing member, e.g., spring, that biases the power push pin away from and out of direct engagement with the power switch rod 310. Accordingly, upon application of a force to the power push pin 402 that is sufficient to overcome the biasing force of the biasing member, the power push pin 402 engages the power switch rod 310. Likewise, in the absence of such force, the power push pin is biased away from, and does not engage, the power switch rod 310.

With continued reference to FIG. 4, a mechanical structure, referred to as a safety push pin 410, extends through a hole (not shown) in the container base 104. The safety push pin 410 is surrounded by a spring (not shown in FIG. 4, but is shown in FIG. 11) and is configured to transition between an extended position where a tip portion 412 of the safety push pin projects downward from the bottom 404 of the container base, and a retracted position where the tip portion 412 is substantially flush with the bottom 404 of the container base. The safety push pin 410 is positioned along the perimeter of the bottom 404 of the bladed container base 104, such that upon complete rotational engagement of the container unit 202 and the motor-power unit 208, the tip portion 412 of the safety push pin is aligned with the top of the safety switch rod 320 of the motor subunit 114.

When the safety push pin 410 and safety switch rod 320 are aligned, the tip portion 412 of the safety push pin is positioned adjacent to the safety switch rod, and is thus capable of engaging the power switch rod. The safety push pin 410 may have an associated biasing member, e.g., spring, that biases the power push pin away from and out of direct engagement with the safety switch rod 320. Accordingly, upon application of a force to the safety push pin 410 that is sufficient to overcome the biasing force of the biasing member, the safety push pin 410 engages the safety switch rod 320. Likewise, in the absence of such force, the power push pin is biased away from, does not engage, the safety switch rod 310.

Returning to FIG. 3, the motor subunit 114 includes a rotor 316 at a location above the top surface 312 of the motor subunit. The rotor 316 is coupled to a motor (not shown) within the housing 314 of the motor subunit 114 and rotates upon activation of the motor. With reference to FIG. 4, the container base 104 includes a clutch 406 at a location recessed relative to the bottom of the container base 404. The clutch 406 is coupled to the bladed mixer 210. Upon engagement of the container unit 202 and the motor-power unit 208, the rotor 316 of the motor subunit 114 aligns with the clutch 406 so that the grooves of the rotor and grooves of the clutch are engaged. Accordingly, upon activation of the motor, the rotor 316 and clutch 406 rotate together, to thereby rotate the bladed mixer 210.

With reference to FIG. 3, the motor subunit 114 includes an alternate activation button 318. The alternate activation button 318 is substantially flush with the outer wall of the housing 314 and is activated by pushing the button inward relative to the outer wall. Because the alternate activation button 318 is flush with the outer wall of the housing 314, the button will not be activated by the circumferential wall of an automobile cup holder when the blender is placed in the holder. The button 318 is aligned to mechanically engage with an alternate power switch of the motor-power unit 208 for turning the blender on and off. The configuration and operation of the alternate activation button 318 and the alternate power switch are further described below with reference to FIGS. 12 and 13.

Figure 5:
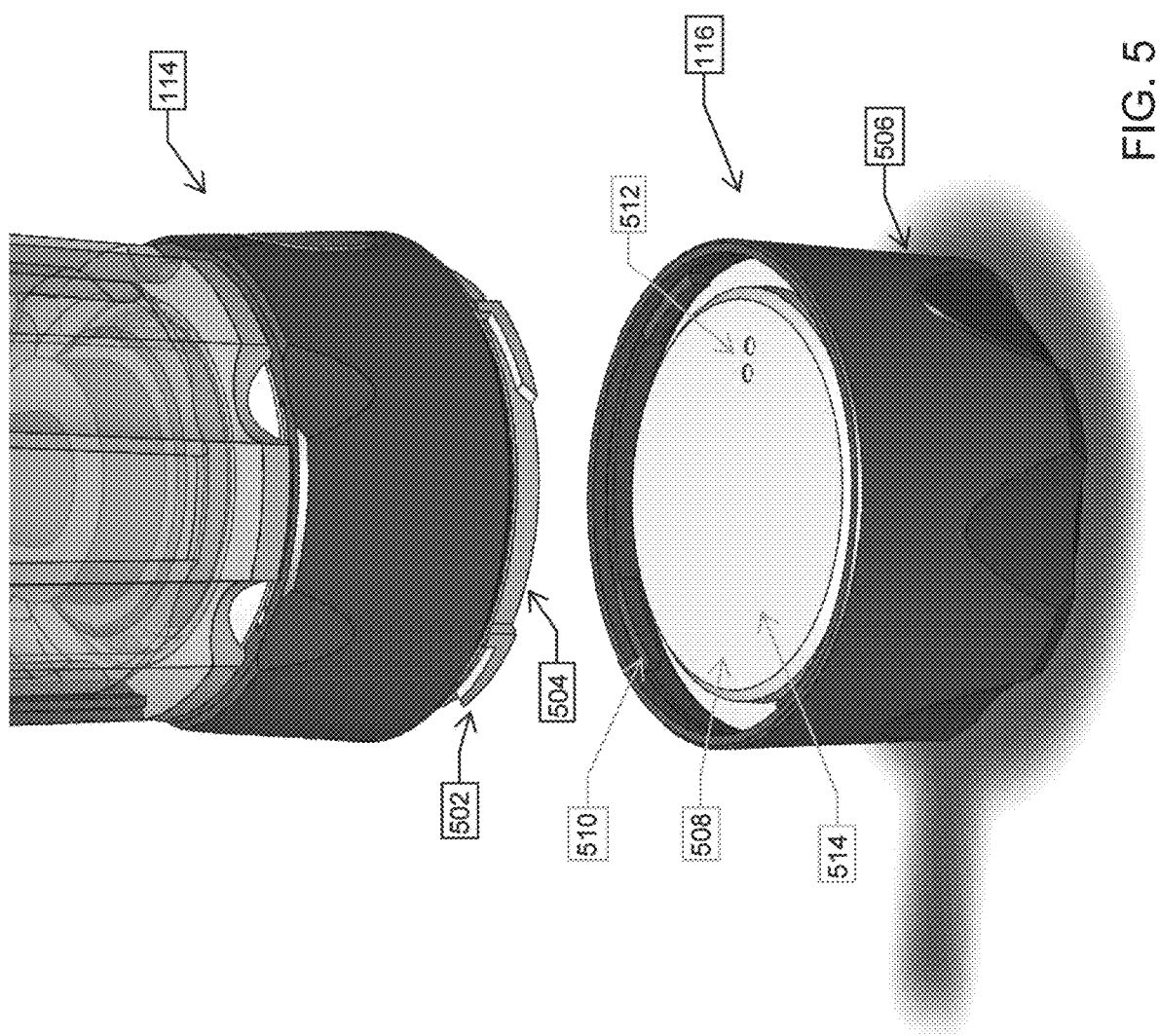
FIGS. 5 and 6 are illustrations of the lower portion of the portable blender of FIG. 2, with a power subunit and motor subunit of the motor-power unit detached from each other.
Figure 6:
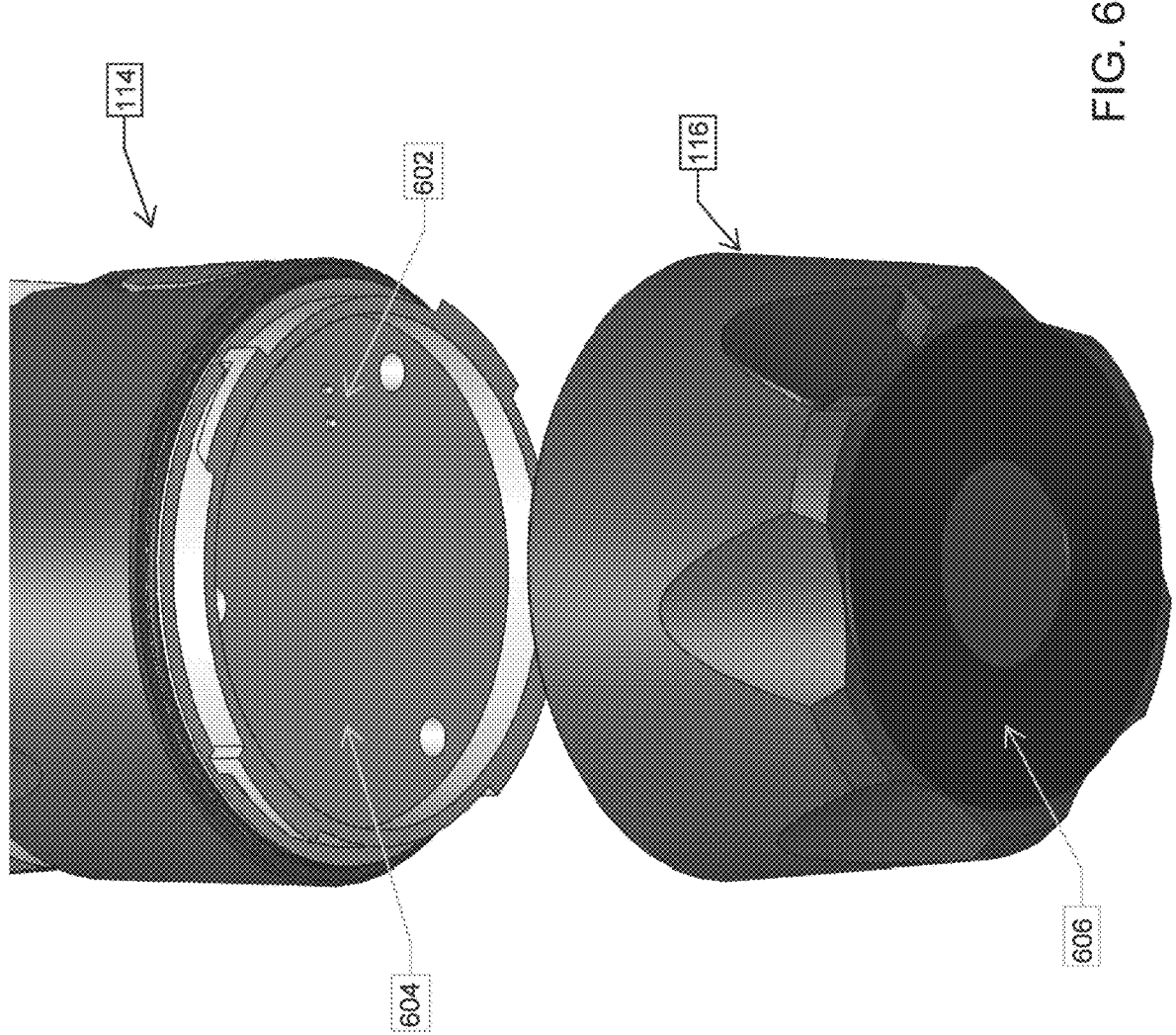

FIGS. 5 and 6 are illustrations of the lower portion of the portable blender 200 of FIG. 2, with the power subunit 116 detached from the motor subunit 114. FIG. 5 is from a perspective showing the top of the power subunit 116, while FIG. 6 is from a perspective showing the bottom of the motor subunit 114. With reference to FIG. 5, the motor subunit 114 includes several interlocking members 502 positioned around the lower perimeter 504 of the motor subunit. The power subunit 116 includes a housing 506 and a power source 508 located within the housing 506. Interlocking members 510 are positioned around the perimeter of the inside wall of the housing. The respective interlocking members 502, 510 are configured to engage each other upon rotational assembly of the power subunit 116 and the motor subunit 114 to thereby secure the units together.

The power source 508 may include one or more disposable batteries or rechargeable batteries. Access to the batteries may be obtained through a removable bottom panel 606 of the power subunit 116. The power subunit 116 may also include an electrical port (not shown) for connecting a cable, such as a micro USB cable, for purposes of recharging the batteries or powering the blender from an external battery, e.g., a car battery. The portable blender may also be directly powered by an external power supply electrically coupled to the blender through the port.

With continued reference to FIG. 5, a pair of electrical contact dimples 512 are located on the top surface 514 of the power source 508. The electrical contact dimples 512 are electrically coupled to the set of batteries included in the power source 508. With reference to FIG. 6, a pair of electrical contact members 602 extend downward from the bottom 604 of the motor subunit 114. The contact members 602 are positioned on the bottom 604 of the motor subunit 114 to align with the electrical contact dimples 512 of the power subunit 116 and electrically couple therewith, upon complete rotational engagement of the power subunit 116 and the motor subunit 114.

The electrical contact members 602 may be spring loaded pogo pin that transitions between a recessed state, during which the electrical contact members are urged into the motor subunit 114 such that the members do not extend downward from the bottom 604 of the motor subunit 114, and an extended state, during which the members 602 do extend downward from the bottom 604 of the motor subunit 114. During initial engagement of the power subunit 116 and the motor subunit 114 and prior to complete rotational engagement of the subunits, the electrical contact members 602 may be urged into the motor subunit 114 by the top surface 514 of the power subunit. The urging of the electrical contact members 602 by the top surface 514 continues until rotational engagement of the power subunit 116 and the motor subunit 114 is complete, at which time the electrical contact members 602 and the electrical contact dimples 512 are aligned and the contact members spring from the motor subunit 114 to electrically couple with the electrical contact dimples 512.

When the electrical contact members 602 and the electrical contact dimples 512 are electrically coupled, an electrical connection is established between the power source 508 and the motor of the motor subunit 114. Upon rotational disengagement of the power subunit 116 and the motor subunit 114, the electrical contact members 602 and the electrical contact dimples 512 disengage.

Figure 7:
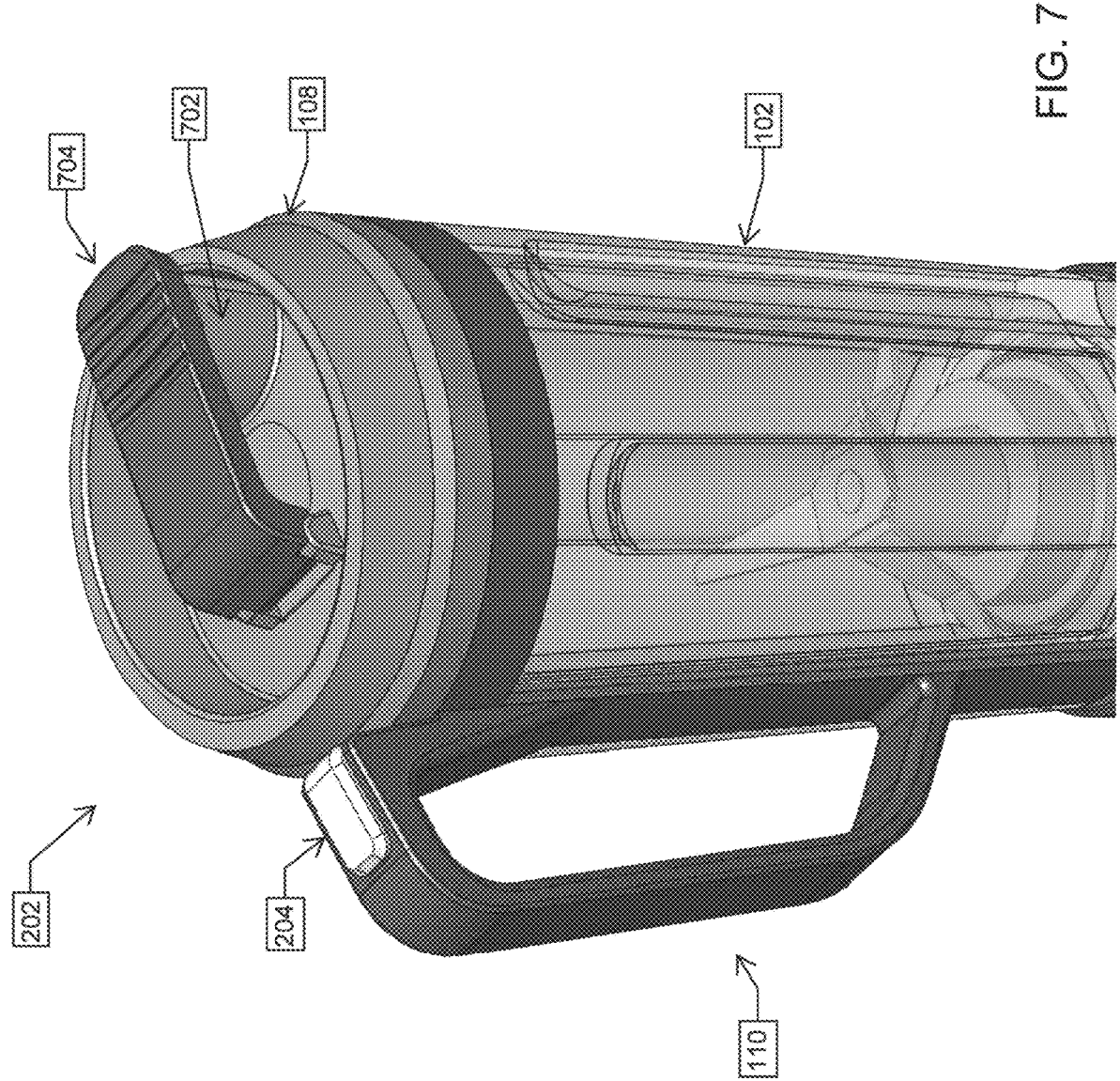
FIG. 7 is an illustration of the container unit of the portable blender of FIG. 2, including a container body, a detachable handle attached to the container body, and a lid secured to the top of the container body.
Figure 8:
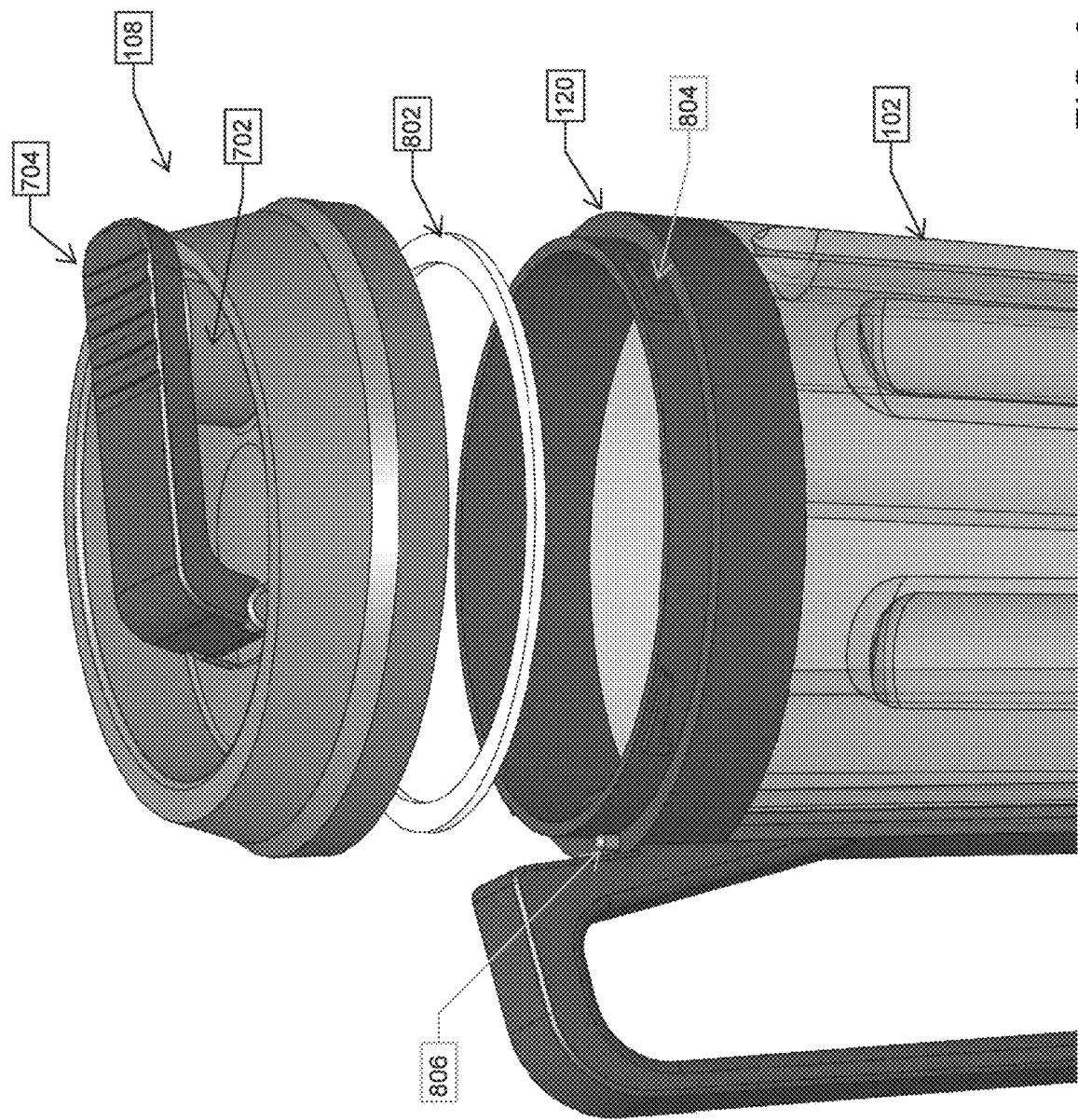
FIG. 8 is an illustration of the upper portion of the container unit of FIG. 7, with the lid removed from the container body.

FIG. 7 is a top perspective illustration of the container unit 202 of the portable blender 200 of FIG. 2 in which the handle activation button 204 is more clearly shown. FIG. 8 is an illustration of the upper portion of the container unit 202 of FIG. 7, with the lid 108 removed from the container body 102. With reference to FIG. 8, components of the lid 108, including an opening 702, a cap 704 for covering the opening, and a gasket 706 for providing a watertight seal between the lid 108 and the top 120 of the container body 102, are shown, along with interlocking members 802 of the container body 102 for engaging with corresponding interlocking members (not shown) on the inside wall of the lid. Also shown in FIG. 8 is the tip 804 of a power safety member that assumes an enabled state when the lid 108 is secured to the container body 102 (as shown in FIG. 7) and a disabled state when the lid is removed from the container body (as shown in FIG. 8). The configuration and operation of the power safety member is further described below with reference to FIGS. 9-13.

Figure 9A:
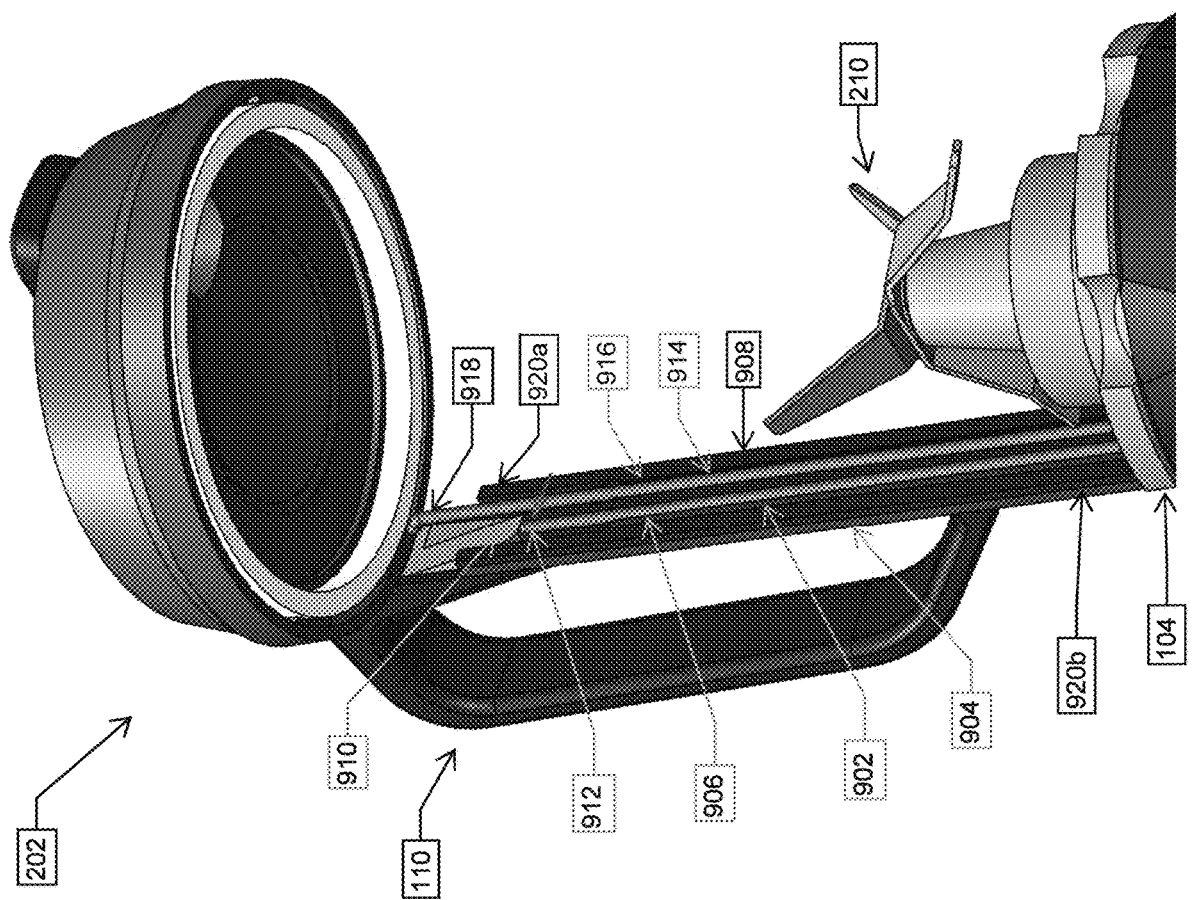
Figure 12:
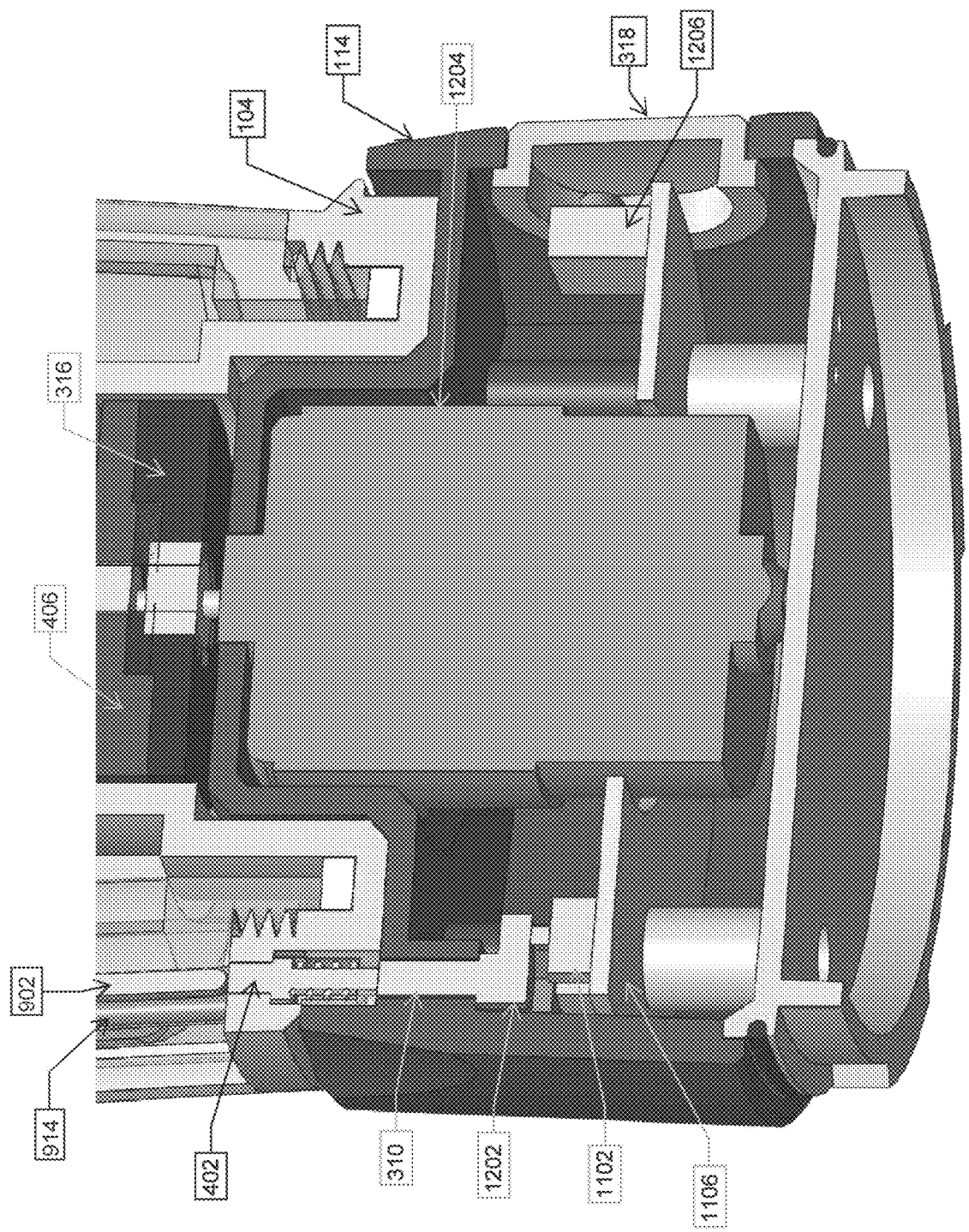
FIG. 12 is a cross-section illustration of the lower region of the portable blender set of FIG. 2, showing components of the container unit and the motor-power unit that control the operation of the blender.
Figure 13:
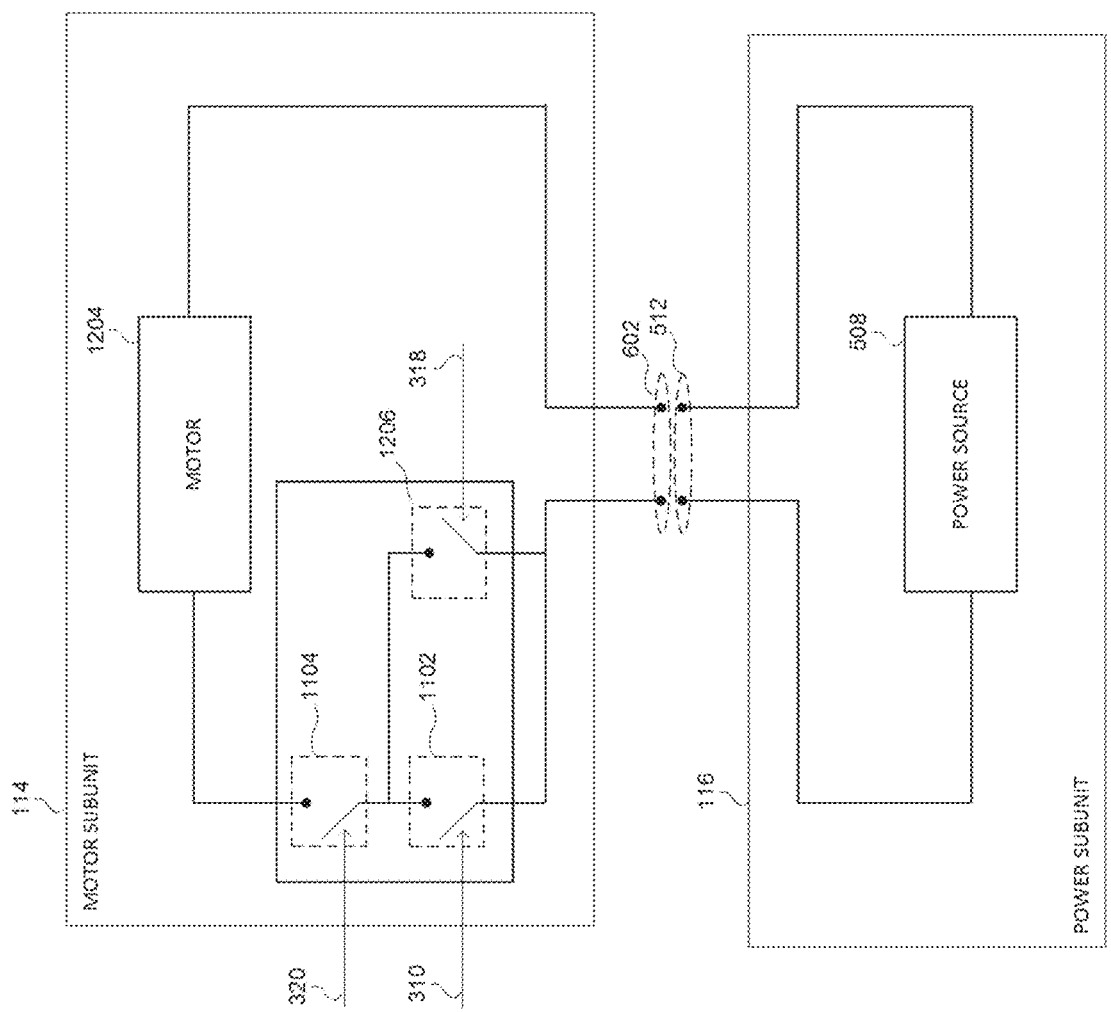
FIG. 13 is a schematic diagram of the portable blender of FIG. 2.

FIGS. 9A and 9B are illustrations of the portable blender 200 of FIG. 2, from different perspectives and with the container body not shown to illustrate components that control the operation of the blender. FIGS. 10A, 10B, and 10C are illustrations of components associated with the detachable handle 110 of FIG. 2 that control the operation of the blender. FIG. 11 is an illustration of components associated with the container unit 202 and the motor-power unit 208 of FIG. 2 that control the operation of the blender. FIG. 12 is a cross-section illustration of the lower region of the portable blender 200 of FIG. 2, showing components that control the operation of the blender. FIG. 13 is a schematic diagram of components that control the operation of the blender.

With reference to FIGS. 2 and 9A-11, the portable blender 200 includes a power activation member 902 that is an elongated structure that extends from the bottom 118 of the container body 102 toward the top 120 of the container body. The power activation member 902 may be formed of a metal or a rigid plastic. The power activation member 902 may be located in a recessed portion 1402 (shown in FIG. 14) of the sidewall 206 of the container body 102 and positioned between the sidewall 206 of the container body 102 and an insert portion 904 of the handle 110. The power activation member 902 is secured in place between the sidewall 206 and the insert portion 904 in a manner that allows for movement of the power activation member in the direction of the height of the container body. In other words, the power activation member 902 may be moved upward and downward relative to the bottom 118 and the top of 120 of the container body.

In one configuration, the power activation member 902 is associated with the handle 110 and lies within a groove 906 that is associated with the backside 908 of the insert portion 904 of the handle, and that extends at least partially along the length of the insert portion. As best shown in FIGS. 10A, 10B, and 10C, retainers 922 extend outward from the backside 908 of the handle at the sides of the groove 906. There is at least one retainer 922 on each side of the groove 906. The retainers 922 are configured to secure the power activation member 902 within the groove 906. For example, the retainers 922 may curve slightly inward toward the longitudinal axis of the groove 906. Alternatively, the power activation member 902 may be associated with the container body 102 and lie within a groove (not shown) that is associated with the sidewall 206 of the container body, and that extends at least partially along the length of the recessed portion 1402 of the sidewall. Regardless of whether the power activation member 902 is associated with the handle 110 or the container body 102, the groove is shaped and sized to both hold the power activation member 902 in association with the sidewall 206, while simultaneously allowing the member to move within the groove upward and downward relative to the bottom 118 and the top of 120 of the container body.

In yet another configuration, the power activation member 902 may lie within a groove 906 extending along the backside 908 of the insert portion 904 of the handle 110, and a groove (not shown) extending along the sidewall 206 of the container body 102. In this case, the respective grooves of the handle and container body combine to define a tubular channel shaped and sized to both hold the power activation member 902 in association with the sidewall 206, while simultaneously allowing the member to move within the groove upward and downward relative to the bottom 118 and the top of 120 of the container body.

With reference to FIGS. 2, 7, and 9A-13, the handle activation button 204 of the handle 110 includes an extension portion 910 that terminates in a location near the top of the insert portion 904 of the handle. The power activation member 902 includes a top, first end 912 that terminates in the region of extension portion 910 of the handle activation button 204, and a bottom, second end 922 that extends to the top of the container base 104, where it is positioned to engage the power push pin 402 of the container base. With the extension portion 910 of the handle activation button 204, the power activation member 902, and the power push pin 402 of the container base 104 arranged in this manner, the components may respectively, and collectively, transition between an active, on state and an inactive, off state by transitioning the handle activation button from a first state to a second state. In the following description, such transitioning is accomplished through the pressing and releasing of the handle activation button, in which case a first state may be a released state and a second state may be a pressed state. Transitioning between first and second states may be accomplished in different ways, e.g., through rotation, sliding, etc., depending on the configuration of the handle activation button.

An active state may be achieved by pressing the handle activation button 204. This pressing causes the extension portion 910 of the handle activation button 204 to engage and displace the power activation member 902, which in turn causes the bottom, second end 922 of the power activation member to engage and displace the power push pin 402, which in turn causes the tip 408 of the power push pin to engage and displace the power switch rod 310, which in turn causes the tip 1202 of the power switch rod to engage and set a power switch 1102 located on a printed circuit board 1106 beneath the power switch rod to an on, closed position. As shown in FIG. 13, closing the power switch 1102 may electrically couple the motor 1204 with the power source 508, thereby providing power to the motor and turning the blender on. Whether power is provided to the motor 1204 upon closing the power switch 1102 depends on whether a safety switch is 1104 is present and if present, whether the safety switch is open or closed. For a blender configured with a safety switch 1104, the closing of the power switch 1102 provides power to the motor 1204 when the safety switch is closed. Details on the safety switch 1104 and its operation are provided below. For a blender that does not include a safety switch 1104, the closing of the power switch 1102 provides power to the motor 1204.

The power switch 1102 may be a momentary switch, in which case the handle activation button 204 is continually pressed to keep the blender on. In this case, the portable blender may be returned to an inactive state by releasing the handle activation button 204. This releasing causes the extension portion 910 of the handle activation button 204, the power activation member 902, the power push pin 402, the power switch rod 310, and the power switch 1102 to disengage from each other, to thereby open the power switch. Opening the power switch 1102 electrically decouples the motor 1204 from the power source 508, thereby removing power from the motor and turning the blender off. Alternatively, the power switch 1102 may be a toggle switch, in which case the handle activation button 204 may be released after turning on the blender, and the blender will remain on until the handle activation button is pressed again.

The components, e.g., the handle activation button, including its extension portion 910, the power activation member 902, the power push pin 402, the power switch rod 310, and the power switch 1102, thus described as controlling the on/off operation of the blender may be collectively referred to as a power activation mechanism or a power activation controller. In this embodiment of the portable blender, the components of the power activation mechanism are distributed between the container unit 202 and motor-power unit 208. For example, the handle activation button 204, including its the extension portion 910, the power activation member 902, and the power push pin 402 may be associated with one or more parts of the container unit 202, including the handle 110 and/or the container body 102, while the power switch rod 310, and the power switch 1102 may be associated with one or more parts of the motor-power unit, including for example, the motor subunit 114.

The portable blender 200 may include a safety feature whereby power can only be applied to the blender if a safety condition is met. For example, a safety condition may require that the lid 108 of the blender be secured in place on the top of the container body 102 before the blender may be turned on. To this end, the portable blender may include a power safety member 914 that is an elongated structure that extends from the bottom 118 of the container body 102 toward the top 120 of the container body. The power safety member 914 may be formed of a metal or a rigid plastic. The power safety member 914 may be located in the recessed portion 1402 (shown in FIG. 14) of the sidewall 206 of the container body 102 and positioned between the sidewall 206 of the container body 102 and the insert portion 904 of the handle 110. The power safety member 914 is secured in place between the sidewall 206 and the insert portion 904 in a manner that allows for movement of the power safety member in the direction of the height of the container body. In other words, the power safety member 914 may be moved upward and downward relative to the bottom 118 and the top of 120 of the container body.

In one configuration, the power safety member 914 is associated with the handle 1101 and lies within a groove 916 associated with the backside 908 of the insert portion 904 of the handle 110, and that extends at least partially along the length of the insert portion. As best shown in FIGS. 10A, 10B, and 10C, retainers 922 extend outward from the backside 908 of the handle at the sides of the groove 916. There is at least one retainer 922 on each side of the groove 916. The retainers 922 are configured to secure the power safety member 914 within the groove 916. For example, the retainers 922 may curve slightly inward toward the longitudinal axis of the groove 916. Alternatively, the power safety member 914 may be associated with the container body 102 and lie within a groove (not shown) associated with the sidewall 206 of the container body 102 and that extends at least partially along the length of the recessed portion of the sidewall. Regardless of whether the power safety member 914 is associated with the handle 110 or the container body 102, the groove is shaped and sized to both hold the power safety member 914 in association with the sidewall 206, while simultaneously allowing the member to move within the groove upward and downward relative to the bottom 118 and the top of 120 of the container body.

In yet another configuration, the power safety member 914 may lie within a groove 916 extending along the backside 908 of the insert portion 904 of the handle 110, and a groove (not shown) extending along the sidewall 206 of the container body 102. In this case, the respective grooves of the handle and container body combine to define a tubular channel shaped and sized to both hold the power safety member 914 in association with the sidewall 206, while simultaneously allowing the member to move within the groove upward and downward relative to the bottom 118 and the top of 120 of the container body.

With reference to FIGS. 2 and 7-13, the power safety member 914 includes a top, first end 918 that extends through the top 120 of the container body 102 to allow for engagement of the lid 108 with the tip 806 of the power safety member, and a bottom, second end 924 that extends to the top of the container base 104, where it is positioned to engage the safety push pin 410 of the container base. With the power safety member 914, and the safety push pin 410 of the container base 104 arranged in this manner, the components may respectively, and collectively, transition between an enabled state and a disabled state through the placement and removal of the lid 108.

An enabled state may be obtained by placing the lid 108 on the top of the container body 102. This placing causes the lid 108 to engage and displace the power safety member 914, which in turn causes the bottom, second end 924 of the power safety member to engage and displace the safety push pin 410, which in turn causes the tip 412 of the safety push pin to engage and displace the safety switch rod 320, which in turn causes the tip of the safety switch to engage and set a safety switch 1104 located on the printed circuit board 1106 beneath the safety switch rod to an enabled, closed position. Closing the safety switch 1104 enables the blender for power activation. A closed safety switch 1104, in combination with a closed power switch 1102 (as described above) electrically couples the motor 1204 with the power source 508, thereby providing power to the motor and turning the blender on. If the power switch 1102 is closed but the safety switch 1104 is opened, the blender cannot assume an active, on state.

The safety switch 1104 may be a momentary switch, in which case the lid 108 is maintained on the container body 102 to keep the blender enabled. In this case, the portable blender may be returned to a disabled state by removing the lid 108 from the container body 102. This removing causes the power safety member 914, the safety push pin 410, the safety switch rod 320, and the safety switch 1104 to disengage from each other to thereby open the safety switch. Opening the safety switch 1104 prevents electrical coupling of the motor 1204 with the power source 508.

The components, e.g., the power safety member 914, the safety push pin 410, the safety switch rod 320, and the safety switch 1104, thus described as controlling the enable/disable state of the blender may be collectively referred to as a power safety mechanism or a power safety controller. In this embodiment of the portable blender, the components of the power safety mechanism are distributed between the container unit 202 and motor-power unit 208. For example, in the embodiment described above, the power safety member 914 and the power safety pin 410 are associated with one or more parts of the container unit 202, including the handle 110 and/or the container body 102, while the safety switch rod 320 and the safety switch 1104 are associated with one or more parts of the motor-power unit, including for example, the motor subunit 114.

With reference to FIGS. 12 and 13, operation of the portable blender may be affected by an alternate activation button 318 associated with the motor subunit 114. In this case, an active state is achieved by pressing the alternate activation button 318. This pressing causes the backside of the alternate activation button 318 to engage and set an alternate power switch 1206 located on the printed circuit board 1106 to an active, closed position. Closing the alternate power switch 1206 electrically couples the motor 1204 with the power source 508, thereby providing power to the motor and turning the blender on.

The alternate power switch 1206 may be a momentary switch, in which case the alternate activation button 318 is continually pressed to keep the blender in an active state. The portable blender may be returned to an inactive state by releasing the alternate activation button 318. This releasing causes the backside of the alternate activation button 318 to disengage from the alternate power switch 1206, to thereby open the power switch. Opening the alternate power switch 1206 electrically decouples the motor 1204 from the power source 508, thereby removing power from the motor and turning the blender off. In another configuration, the alternate power switch 1206 may be a toggle switch, in which case the alternate activation button 318 may be released after turning the blender on, and the blender will remain on until the alternate activation button is pressed again.

Figure 14:
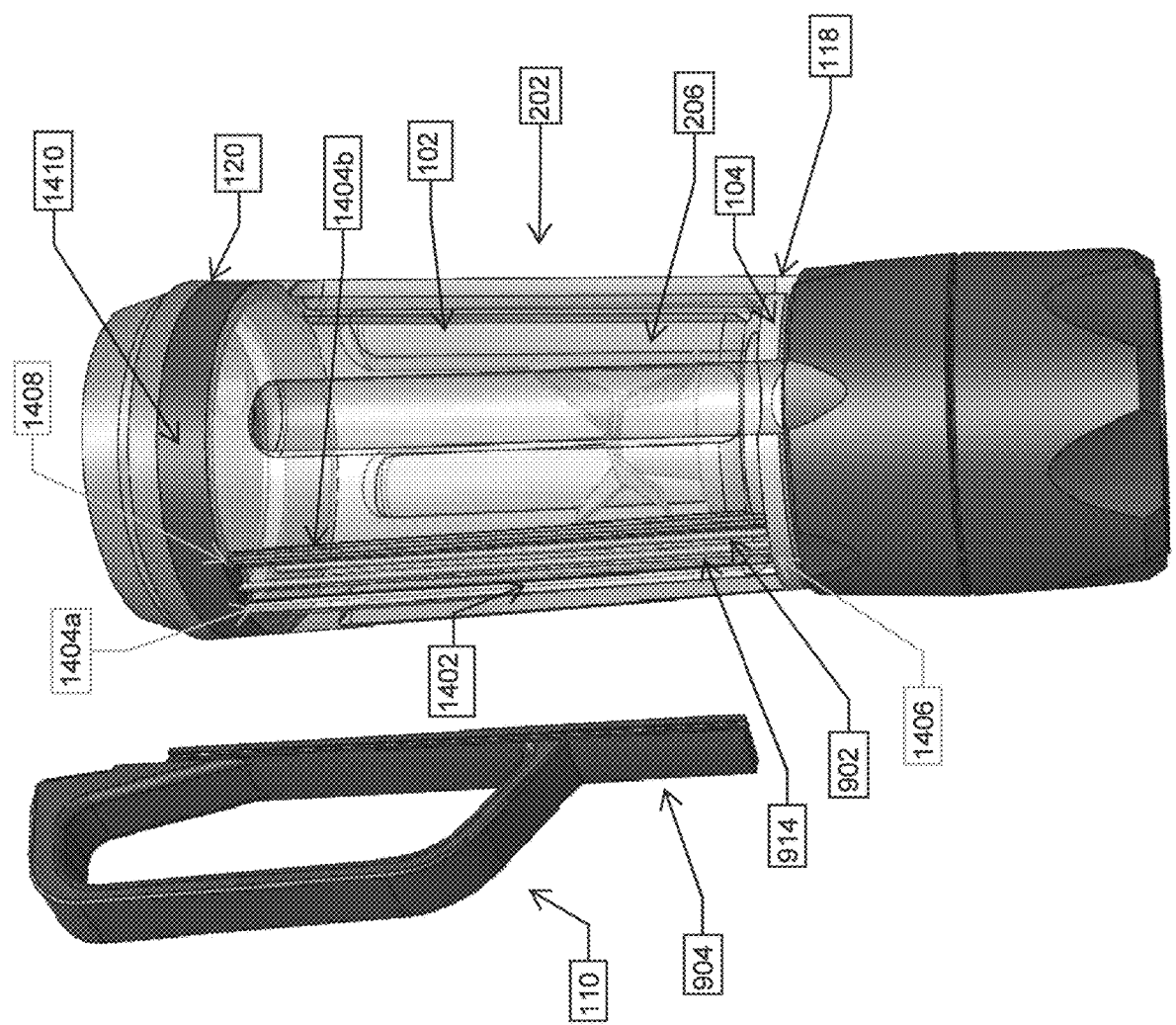
FIG. 14 is an illustration of the portable blender set of FIG. 2 with the detachable handle removed from the container body.
Figure 15:
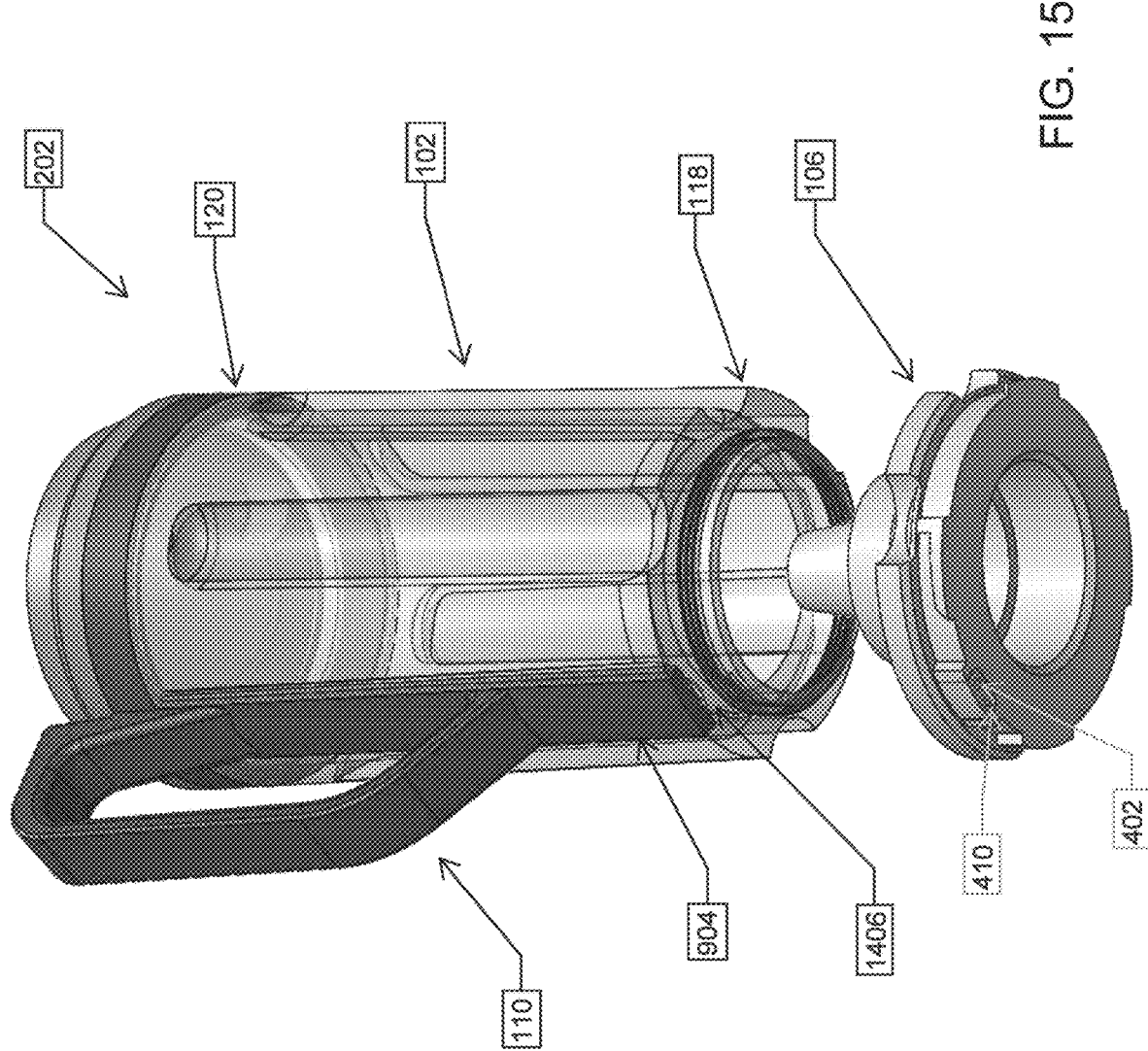
FIGS. 15, 16, and 17 are a series of illustrations of the container unit depicting different stages of removal of the detachable handle from the container body.
Figure 16:
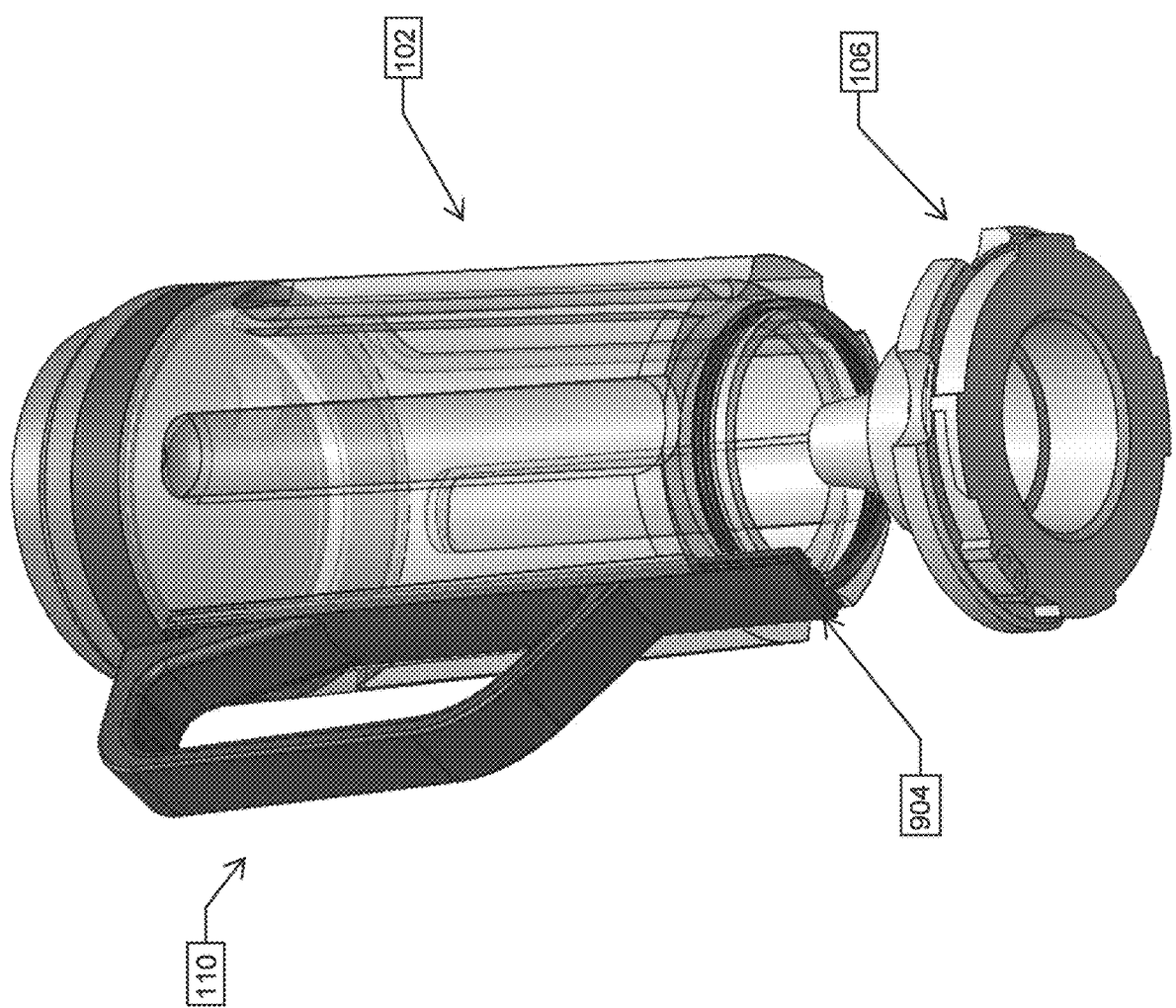
Figure 17:
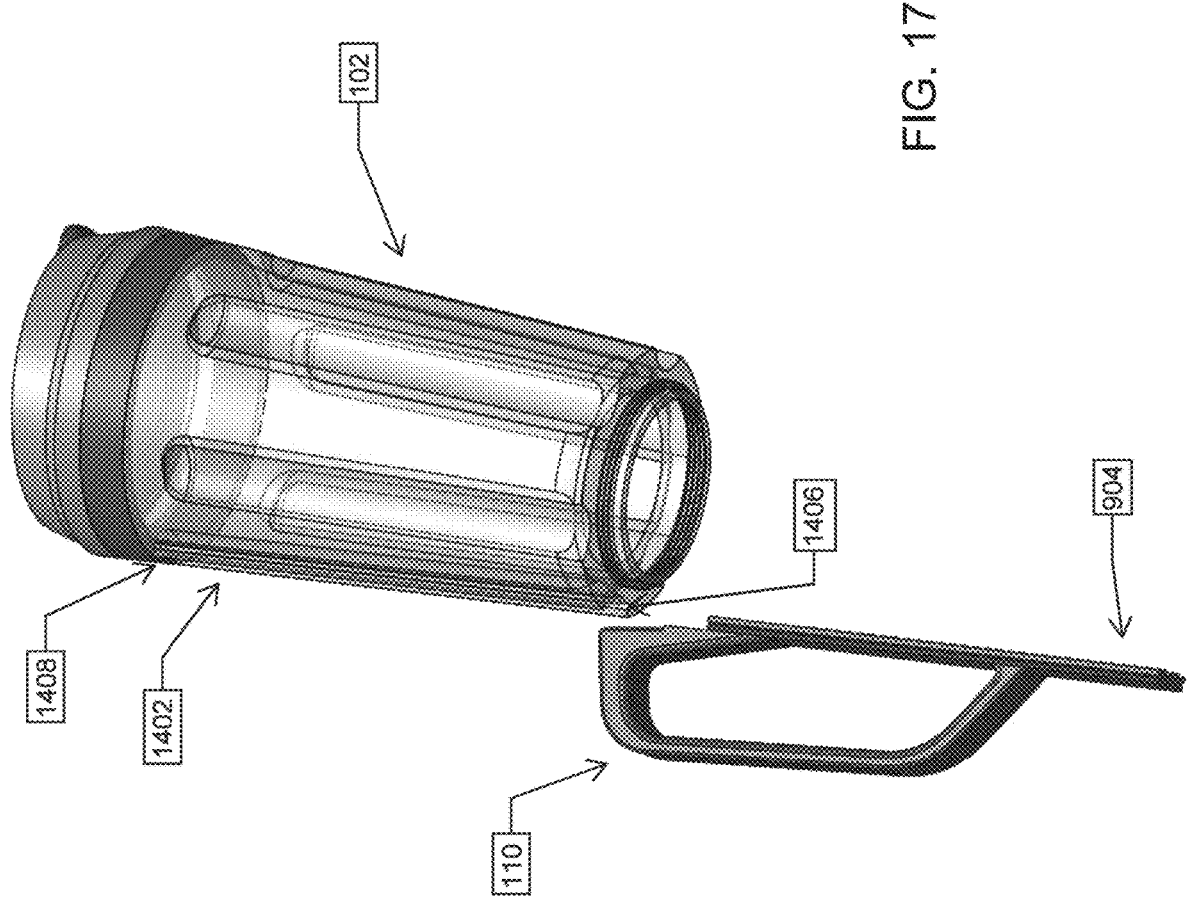

FIG. 14 is an illustration of the portable blender of FIG. 2 with the handle 110 removed from the container body 102. While the power activation member 902 and power safety member 914 are shown in FIG. 14 positioned on the container body 102, these components are typically integrated with the handle 110, as shown and described above with reference to FIGS. 10A, 10B, and 10C. FIGS. 15, 16, and 17 are a series of illustrations of the container unit 202 depicting different stages of removal of the handle 110 from the container body 102. The handle 110 and container body 102 are configured such that the handle may be detached or removed from the container body. To this end, the handle 110 may include at least one first attachment structure, and the container body 102 may include at least one second attachment structure, that is configured to engage with the at least one attachment structure of the handle to thereby attach the handle to the container body. With reference to FIGS. 9 and 14-17, in one configuration, the first attachment structure of the handle includes a pair of rails 920a, 920b, while the second attachment structure of the container body includes a corresponding pair of rail receptors 1404a, 1404b.

With reference to FIGS. 9A-10C, and further regarding the first attachment structure of the handle 110, the insert portion 904 of the handle 110 includes an attachment structure, e.g., a pair of rails 920a, 920b, that projects outward from the backside 908 of the insert portion and extend along the sides of the insert portion. The rails 920a, 920b best shown in FIGS. 10A, 10B, and 10C are formed to have a wedged, L-shaped cross section. The rails, however, may be formed to have other cross-section shapes.

With reference to FIG. 14, and further regarding the second attachment structure of the container body 102, a sidewall 206 of the container body includes a recessed portion 1402 extending from the bottom 118 of the container body toward the top 120 of the container body. A second attachment structure, e.g., a pair of rail receptors 1404a, 1404b, extends along the sides of the recessed portion 1402. The rail receptors 1404a, 1404b are shaped and sized to receive the rails 920a, 920b of the handle 110. For example, if the rails 920a, 920b of the handle 110 are formed to have a wedged, L-shaped cross section, the rail receptors 1404a, 1404b may be formed to have a wedged, L-shaped opening sized to receive the t-shaped rails.

With respect to the container body 102, the recessed portion 1402 may be described as having an open end 1406 at the bottom 118 of the container body, and a closed end 1408 at the top of the container body. As shown in FIG. 14, when the container base 104 is coupled to the container body 102, the open end 1406 of the recessed portion 1402 is closed or blocked by the container base.

With reference to FIG. 15, a handle 110 may be removed from a container body 102 by first removing the container base 106 from the container body. This is done by rotating the container base 106 relative to the container body 102. With additional reference to FIGS. 16 and 17, upon removal of the container base 106, the open end 1406 of the recessed portion is exposed and the handle 110 may be detached from the container body 102 by pushing down on the handle in the direction of the bottom 118 of the container body, and thereby sliding the rails 920a, 920b of the insert portion 904 of the handle along the rail receptors 1404a, 1404b of the container body 102. This pushing and sliding is done until the insert portion 904 of the handle is completely removed from the container body 102.

Attachment of the handle 110 to the container body 102 may be accomplished in an opposite manner That is, the rails 920a, 920b of the handle 110 may be aligned with the rail receptors 1404a, 1404b at the open end 1404 of the recessed portion 1402 at the bottom 118 of the container body 102. The handle 110 is attached to the container body 102 by sliding the handle upward toward the top 120 of the container body until the handle abuts the closed end 1408 of the recessed portion 1402 and can no longer be advanced. The container base 104 is then secured to the bottom 118 of the container body 102 to thereby close or block the open end 1404 of the recessed portion 1402 and prevent the handle from sliding out of the container body and thereby retain the handle 110 in place.

In the just described configuration, the handle 110 is attached to, or detached from, the container body 102 through an open end 1406 at the bottom of the container body. In an alternate configuration, the handle 110 may be attached to, or detached from, the container body 102 through an open end at the top 120 of the container body 102. For example, with reference to FIG. 14, the upper rim 1410 of the container body 102 may be removable. As such, the otherwise closed end 1408 of the recessed portion 1402 of the container body 102 may be opened by removing the upper rim 1410. The handle 110 may then be inserted into, or removed from, the container body 102 through the opening at the top of the container body.

While the foregoing describes a handle attachment configuration that includes rails and rail receptors, other configurations are possible. For example, the first attachment structure associated with the handle may be a snap-fit projection, e.g. a hook shaped member extending from the backside of the handle, and the second attachment structure associated with the container body may be a snap-fit receptor, e.g., a hole or notch in the sidewall of the container body, configured to receive the snap-fit projection. In this configuration, the handle 110 may be snap fitted to the container body by forcing the snap-fit projection into the snap-fit receptor. A mechanism, e.g., a push button or lever, may be associated with one of the handle or container body and activated to release the snap-fit projection from the snap-fit receptor to detach the handle from the container body.

Figure 19:
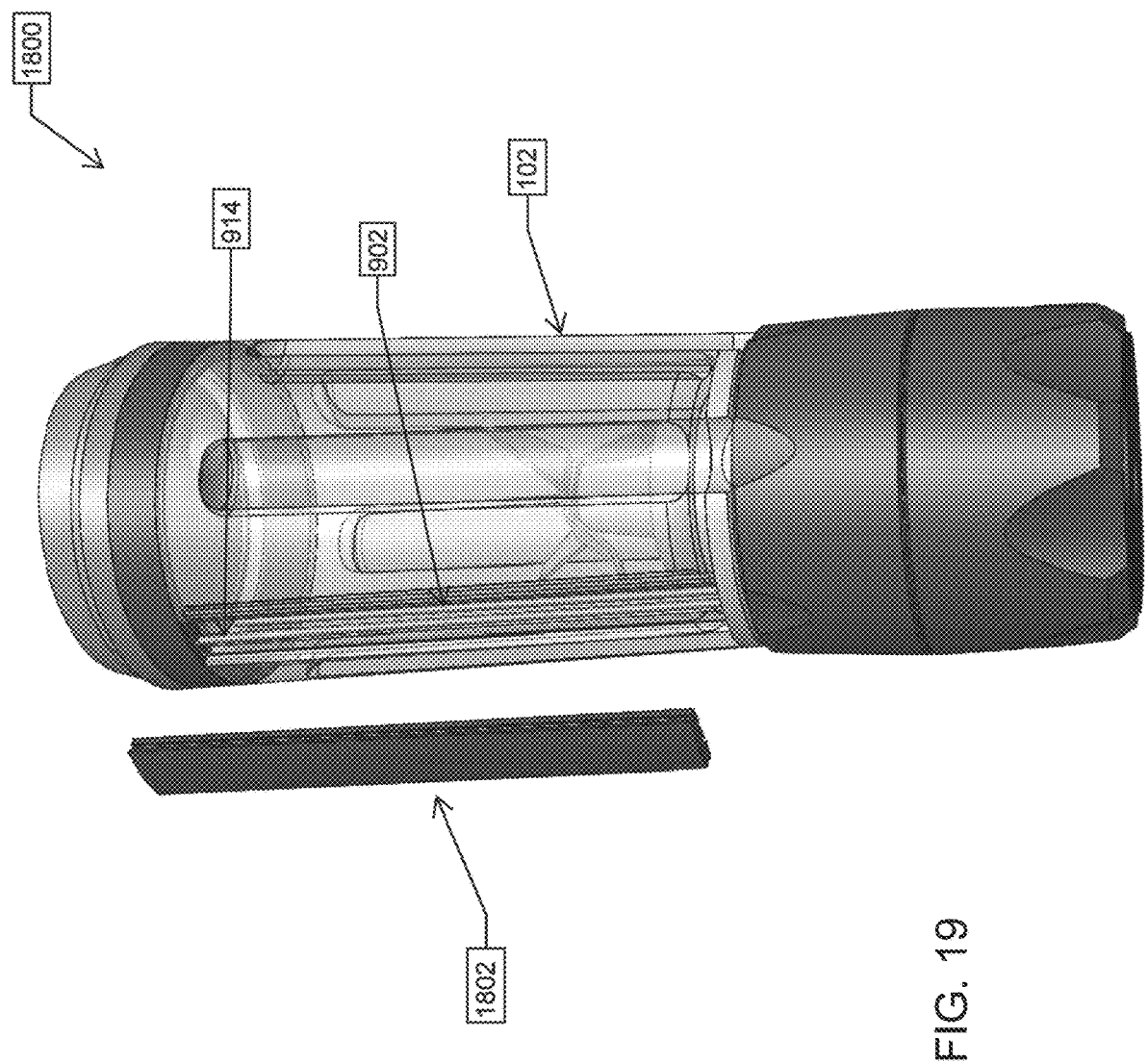
FIG. 19 is an illustration of the portable blender set of FIG. 18 with the detachable insert removed from the container body.

FIG. 18 is an illustration of a portable blender 1800 assembled from the components of the portable blender set of FIG. 1, that includes a container unit 202 and a motor-power unit 208 which are detachable from each other, and a detachable insert 1802 in place of a handle. FIG. 19 is an illustration of the portable blender set of FIG. 18 with the detachable insert 1802 removed from the container body 102. While a power activation member 902 and a power safety member 914 are shown in FIG. 19 positioned on the container body 102, these components are typically integrated with the backside of the insert 1802, like the handle configuration shown and described above with reference to FIGS. 10A, 10B, and 10C. The configuration of the detachable insert 1802 illustrated in FIGS. 18 and 19 does not have an activation button. Accordingly, when the insert 1802 is attached to the container body 102, the power activation member 902 does not function to control operation of the blender. The power safety member 914, however, operates the same as described above with reference to FIGS. 2-13. In another configuration (not shown), the insert may include an activation button, in which case power activation member 902 would operate the same as described above with reference to FIGS. 2-13.

Regarding the insert 1802, it is configured the same as the insert portion 904 of the handle 110 in the portable blender set of FIG. 2. The insert 1802 is removed from the container body in the same manner as described above with reference to FIGS. 15-17.

Figure 20:
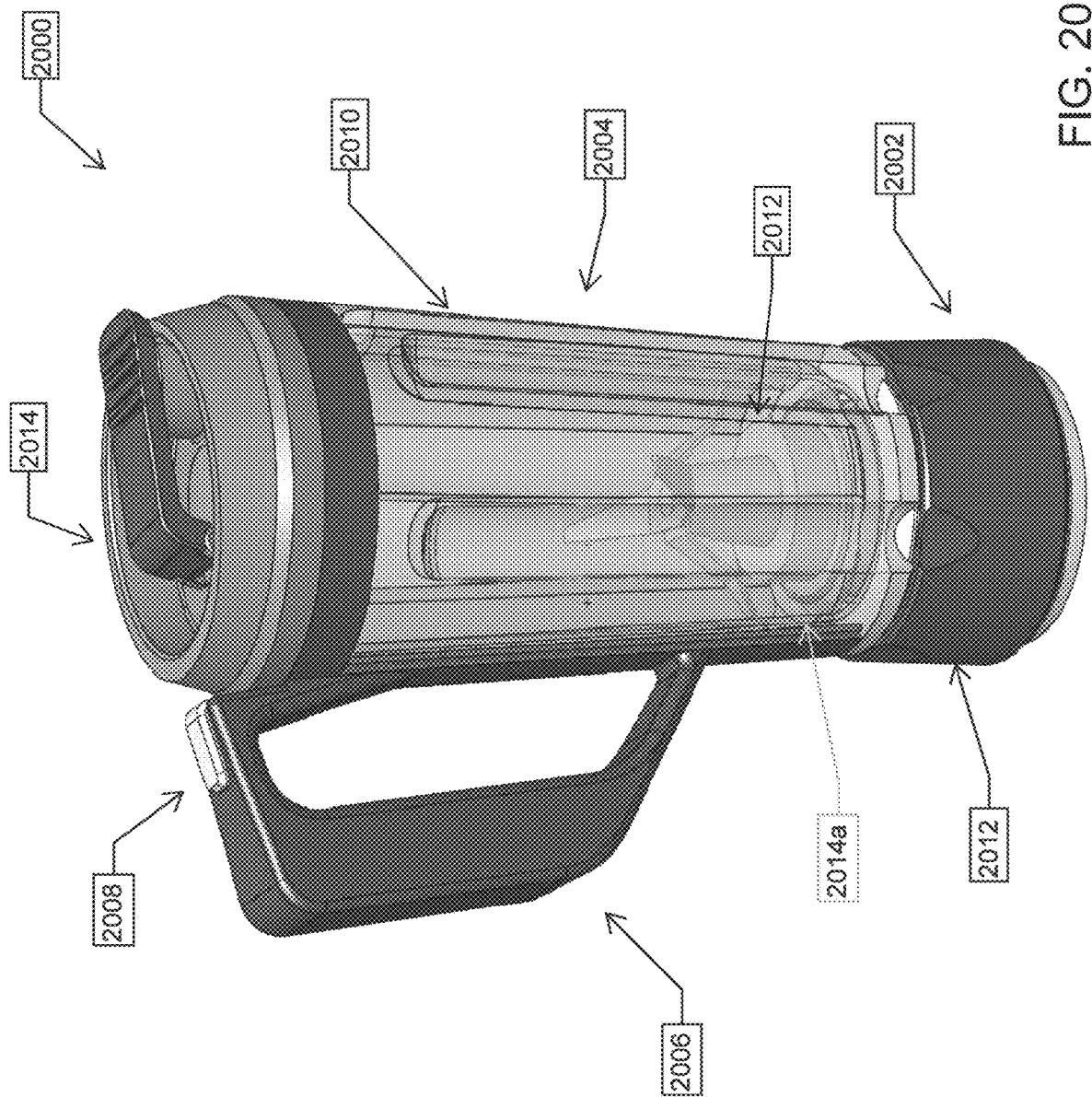
FIG. 20 is an illustration of a portable blender including a motor subunit and a container unit having a detachable handle with a power subunit for powering the motor.

FIG. 20 is an illustration of a portable blender 2000 assembled from a portable blender set having some components in common with the portable blender set of FIG. 1, and some different components. The common components include a motor subunit 2002, a container unit 2004, a bladed container base 2014, and a lid 2014. Different components relative to the portable blender set of FIG. 1, include a detachable handle 2006 with a power subunit 2102. The assembled portable blender 2000 includes a container unit 2004 having a container body 2010, and a detachable handle 2006 with a power subunit 2102 for powering the motor, and a handle activation button 2008 for turning the blender on and off. The container unit 2004 is configured the same as the container unit 202 described above for the blender of FIG. 2. Accordingly, a description of the container unit 2004 is not provided here and reference is made instead to all foregoing descriptions related to the container unit 202. Likewise, the motor subunit 2002 is configured the same as the motor subunit 114 described for the blender of FIG. 2. Accordingly, a description of the motor subunit 2002 is not provided here and reference is made instead to all foregoing descriptions related to the motor subunit 114.

Figure 21A:
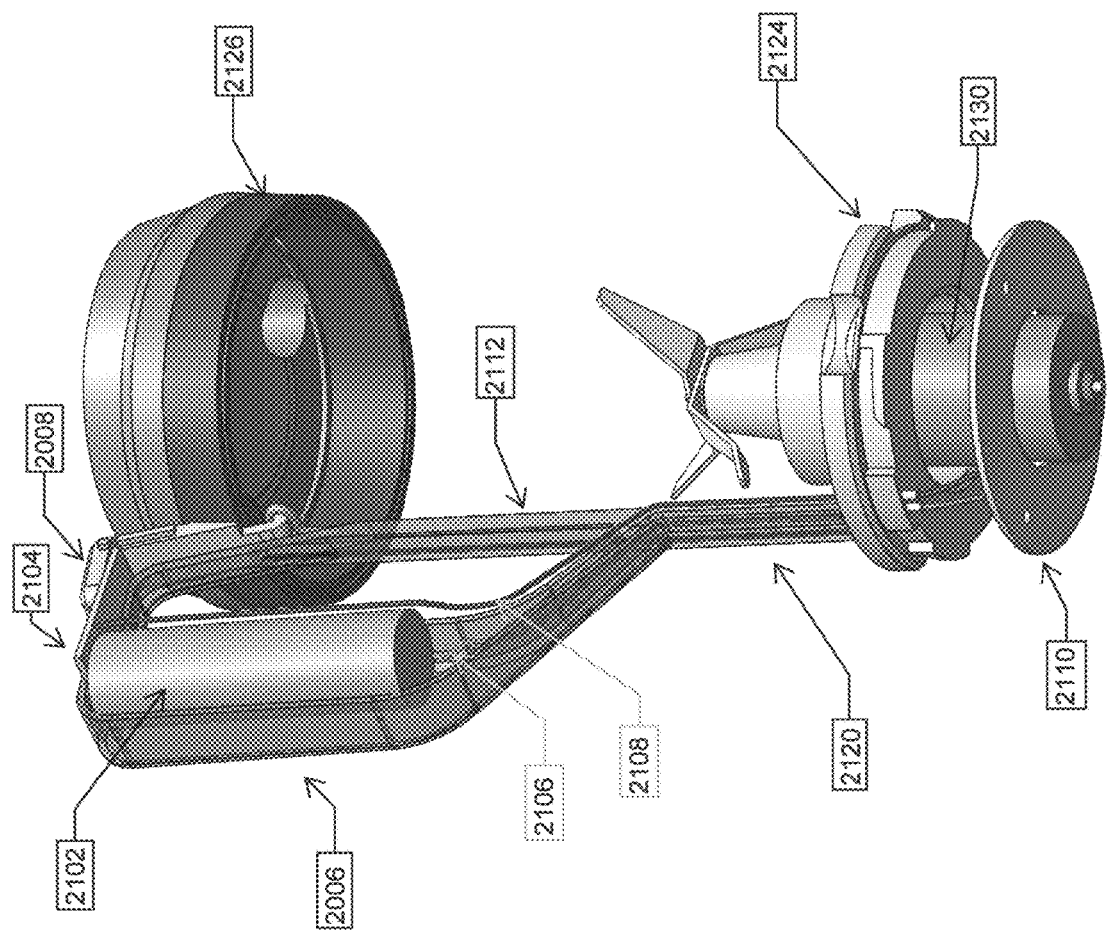
FIGS. 21A and 21B are illustrations of the portable blender of FIG. 20 with portions of the container unit, the motor subunit, and the handle not shown to illustrate components that control the operation of the blender.
Figure 21B:
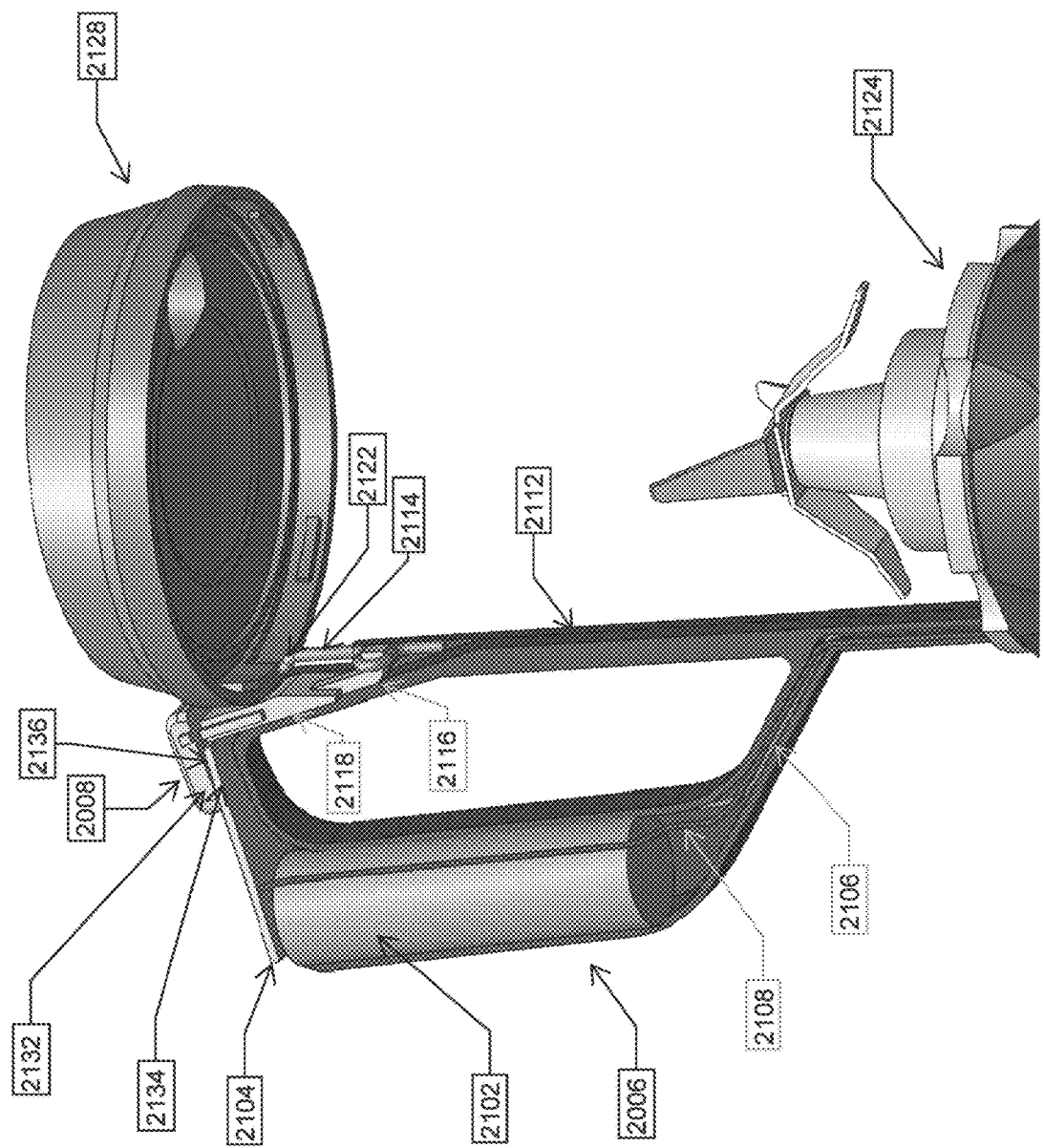
Figure 22A:
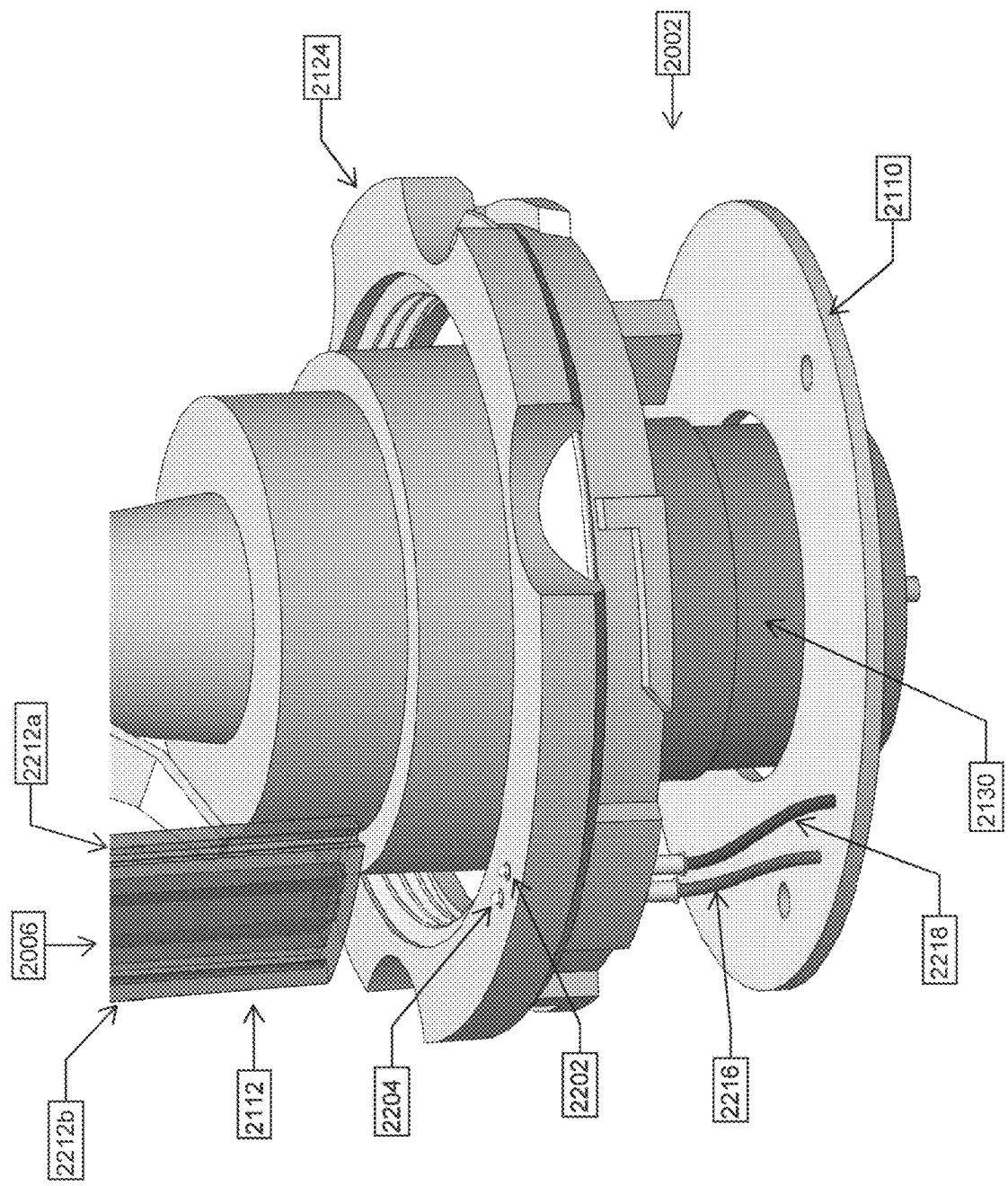
FIGS. 22A and 22B are illustrations of the lower portion of the portable blender as shown in FIG. 21A, showing the electrical interconnection between the power subunit of the handle and the motor subunit.
Figure 22B:
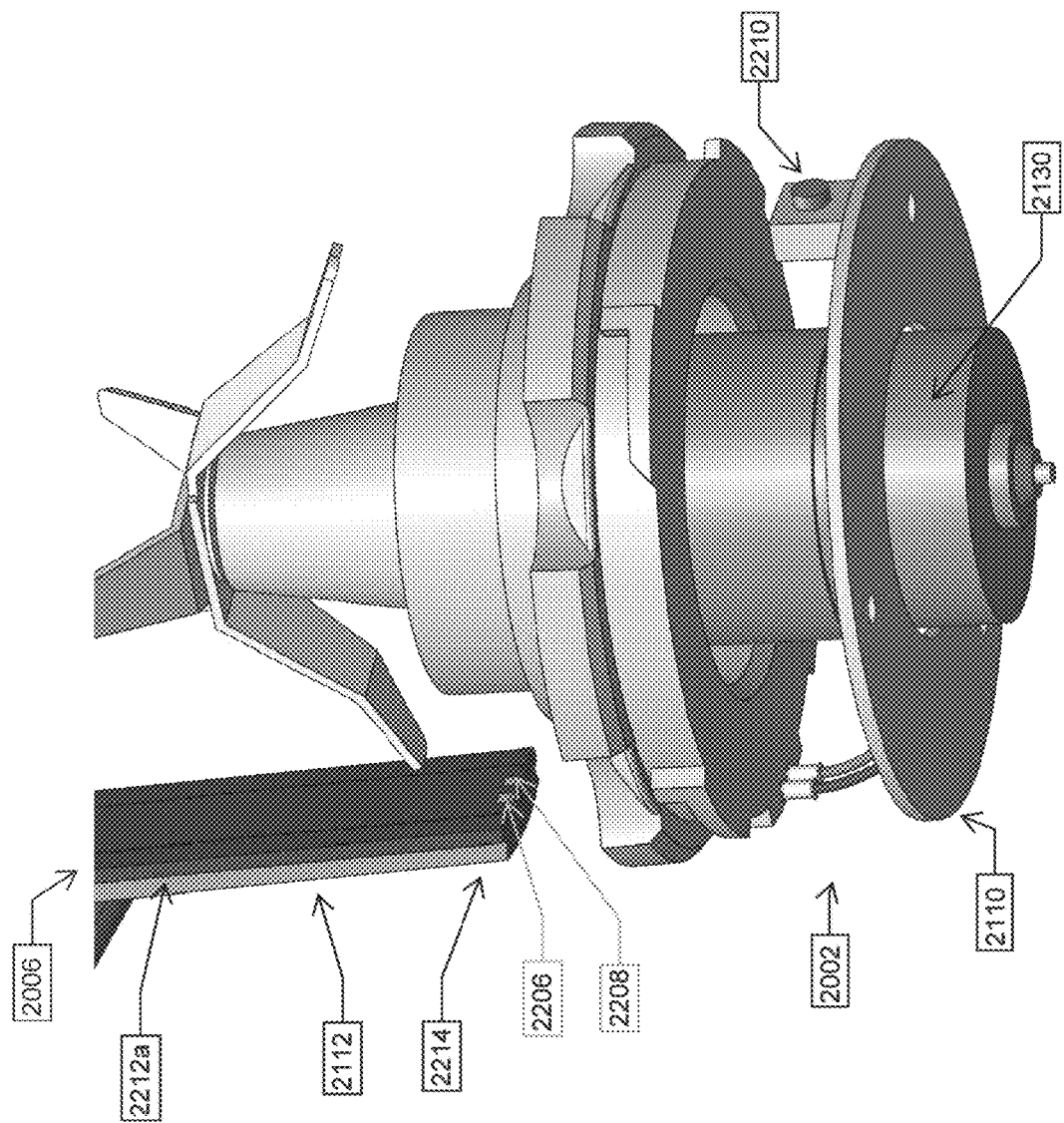

FIGS. 21A and 21B are illustrations of the portable blender 2000 of FIG. 20 with the container body 2010, the housing 2012 of the motor subunit 2002, and a side of the handle 2006 not shown to illustrate components that control the operation of the blender. FIGS. 22A and 22B are illustrations of the lower portion of the portable blender as shown in FIG. 21A but with an insert portion 2112 of the handle separated from a container base 2124 to more clearly show the electrical interconnection between the power subunit 2102 of the handle and components of the motor subunit 2002.

In this embodiment, the detachable handle 2006 includes the power subunit 2012, a handle printed circuit board 2104, a first handle conductor 2106, and a second handle conductor 2108. The first handle conductor 2106 extends between the power subunit 2102 and the lower portion 2120 of the insert portion 2112 of the handle. The second handle conductor 2108 extends between the handle printed circuit board 2104 and the lower portion 2120 of the insert portion 2112 of the handle. As shown in FIG. 22B, each of the handle conductors 2106, 2108 terminates at a respective metal contact 2206, 2208 at the bottom 2214 of the handle insert 2112. Although hidden by the power activation button 2008 in FIGS. 21A and 21B, the handle printed circuit board 2104 includes a power switch 2134 and a safety switch 2136 like the switches 1102, 1104 shown on the printed circuit board 1106 in FIG. 11.

As best shown in FIG. 21B, the handle activation button 2008 of the detachable handle 2006 includes an extension 2118 that extends downward from the top of the handle toward the insert portion 2112 of the handle. The extension 2118 includes a channel configured to receive a safety switch rod 2116. The channel and safety switch rod 2116 are respectively sized to allow for the switch rod to slide back and forth within the channel. The bottom end of the safety switch rod 2116 is mechanically coupled to a power safety member 2114. The power safety member 2114 extends upward along the top portion of the container body (not shown) toward the top of the container body and has a tip 2122 that passes through an opening in the top of the container body. While neither the container body nor opening are shown in FIG. 21B, reference is made to FIG. 8, which shows a top 120 of a container body 102 through which a tip 806 of a power safety member passes. With respect to these features, the portable blender of FIGS. 21A and 21B is similarly configured.

With reference to FIGS. 20, 22A and 22B, the metal contacts 2206, 2208 at the bottom 2214 of the insert portion 2112 of the detachable handle align with corresponding electrical contacts 2202, 2204 on the top of the container base 2124. The electrical contacts 2202, 2204 may be, for example, pogo pin contacts. When the detachable handle 2006 is fully attached to the container body 2010, such as shown in FIG. 20, each of the metal contacts 2206, 2208 engage a respective one of the electrical contacts 2202, 2204. Electrical connection between the electrical contacts 2202, 2204 and the motor subunit 2002 is provided by respective electrical contacts (not shown) located on the bottom 2124 of the container base and the top of the motor subunit 2002. These electrical contacts may be like the electrical contacts shown and described above with reference to FIGS. 5 and 6, and become engaged upon rotational coupling of the bottom 2124 of the container base with the top of the motor subunit 2002. Electrical connection with the motor printed circuit board 2110 is provided by a first motor-subunit conductor 2216 and a second motor-subunit conductor 2218 extending between the electrical contacts at the top of the motor subunit 2002 and the motor printed circuit board 2110.

With reference to FIGS. 21A-23, the handle activation button 2008 of the handle 2006 may transition between an active, on state and an inactive, off state by transitioning the handle activation button from a first state to a second state. In the following description, such transitioning is accomplished through the pressing and releasing of the handle activation button, in which case a first state may be a released state and a second state may be a pressed state. Transitioning between first and second states may be accomplished in different ways, e.g., through rotation, sliding, etc., depending on the configuration of the handle activation button.

An active state may be achieved by pressing the handle activation button 2008. This pressing causes a power activation member 2132 on the underside of the handle activation button 2008 to engage and set a power switch 2134 located on the handle printed circuit board 2104 to an on, closed position. The power activation member 2132 may be a rod shaped member projecting downward from the underside of the handle activation button 2008. Alternatively, the power activation member 2132 may simply be a portion of the underside surface of the handle activation button 2008.

Figure 23:
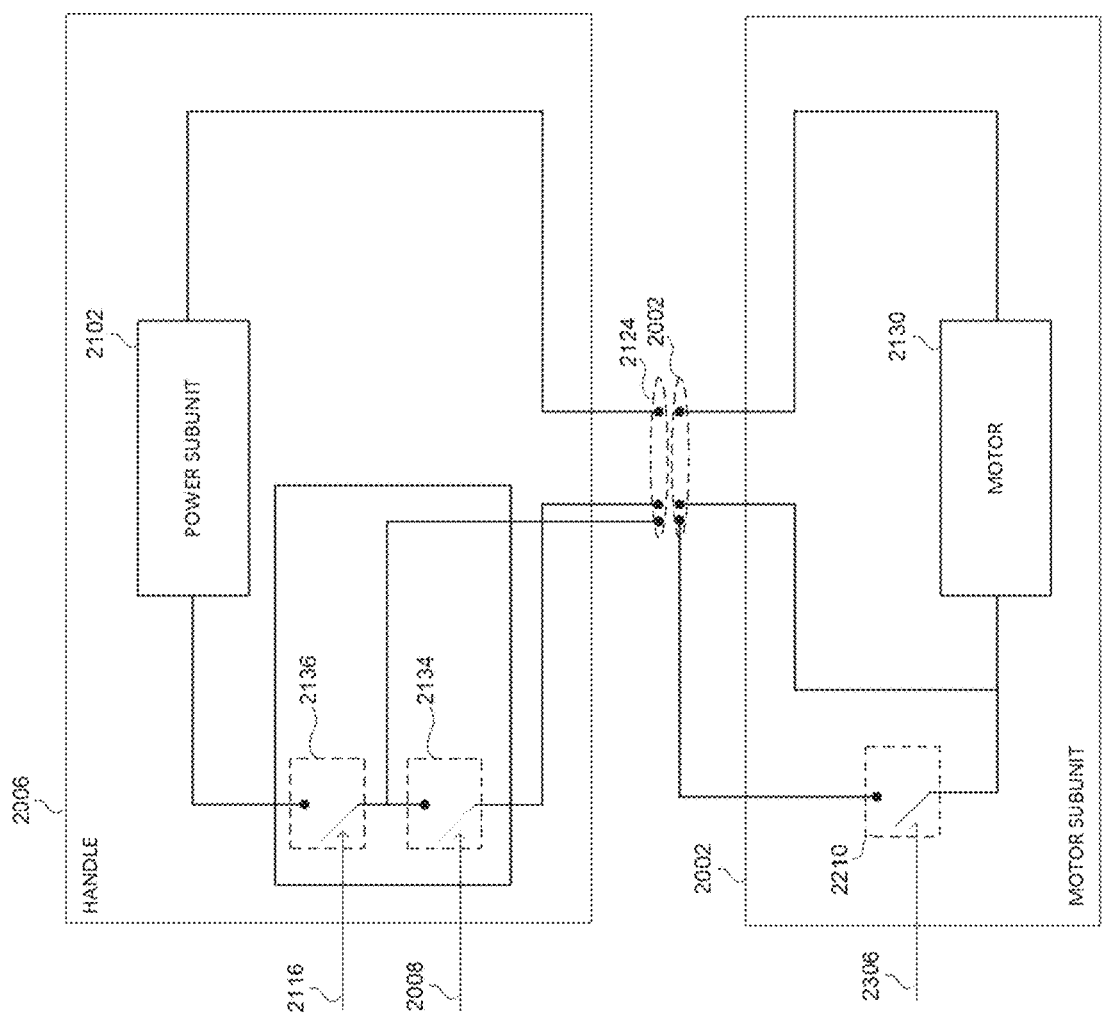
FIG. 23 is a schematic diagram of the portable blender of FIG. 20.

As shown in FIG. 23, closing the power switch 2134 may electrically couple the motor 2130 with the power subunit 2102, thereby providing power to the motor and turning the blender on. Whether power is provided to the motor 2130 upon closing the power switch 2134 depends on whether a safety switch 2136 is present and if present, whether the safety switch is open or closed. For a blender configured with a safety switch 2136, the closing of the power switch 2134 provides power to the motor 2130 when the safety switch is closed. Details on the safety switch 2136 and its operation are provided below. For a blender that does not include a safety switch 2136, the closing of the power switch 2134 provides power to the motor 2130.

The power switch 2134 may be a momentary switch, in which case the handle activation button 2008 is continually pressed to keep the blender on. The portable blender may be returned to an inactive state by releasing the handle activation button 2008. This releasing causes the power activation member 2132 on the underside of the handle activation button 2008 to disengage from the power switch 2134, to thereby open the power switch. Opening the power switch 2134 electrically decouples the motor 2130 from the power subunit 2102, thereby removing power from the motor and turning the blender off. Alternatively, the power switch 2134 may be a toggle switch, in which case the handle activation button 2008 may be released upon turning on the blender, and the blender will remain on until the handle activation button is pressed again.

The components, e.g., the handle activation button 2008, the power activation member 2132, and the power switch 2134, thus described as controlling the on/off operation of the blender may be collectively referred to as a power activation mechanism or a power activation controller. In this embodiment of the portable blender, the components of the power activation mechanism are associated with the handle 2006.

With reference to FIGS. 21A-23, as previously described, the power safety member 2114 includes a top, first end that extends through the top 2126 of the container body to allow for engagement of the lid 2128 with the tip 2122 of the power safety member, and a lower, second end that is mechanically coupled to the safety switch rod 2116. With the power safety member 2114, and the safety switch rod 2116 arranged in this manner, the components may respectively, and collectively, transition between an enabled state and a disabled state through the placement and removal of the lid 2128.

An enabled state is obtained by placing the lid 2128 on the top of the container body. This placing causes the lid 2128 to engage and displace the power safety member 2114, which in turn causes the lower, second end of the safety switch rod 2116 to move downward, which in turn causes an upper, first end (not shown) of the safety switch rod to engage and set a safety switch 2136 located on the printed circuit board 2104 beneath the safety switch rod to an enabled, closed position. Closing the safety switch 2136 enables the blender for power activation. A closed safety switch 2136, in combination with a closed power switch 2134 (as described above) electrically couples the motor 2130 with the power subunit 2102, thereby providing power to the motor and turning the blender on. If the power switch 2134 is closed but the safety switch 2136 is opened, the blender cannot assume an active, on state.

With reference to FIG. 21B, the first end of the safety switch rod 2116 may be near the top end of the extension 2118 portion of the handle activation button 2008 and may rest in a pocket (not shown) underneath the handle activation button. The first end of the safety switch rod 2116 and the underside of the handle activation button 2008 are arranged and configured so that they operate independent of each other. To this end, pressing of the handle activation button 2008 will not cause the first end of the safety switch rod 2116 to engage and set the safety switch 2136 located on the printed circuit board 2104 beneath the safety switch rod to an enabled, closed position. Likewise, placing a lid 2128 on the top of the container body, which displaces the safety switch rod 2116, will not cause the power activation member 2132 on the underside of the handle activation button 2008 to engage and set the power switch 2134 located on the handle printed circuit board 2104 to an on, closed position.

The safety switch 2136 may be a momentary switch, in which case the lid 2128 is maintained on the container body to keep the blender enabled. The portable blender may be returned to a disabled state by removing the lid 2128 from the container body. This removing causes the power safety member 2114 and the safety switch 2136 to disengage from each other to thereby open the safety switch. Opening the safety switch 2136 prevents electrical coupling of the motor 2130 with the power subunit 2102.

The components, e.g., the power safety member 2114, the safety switch rod 2116, and the safety switch 2136, thus described as controlling the enable/disable state of the blender may be collectively referred to as a power safety mechanism or a power safety controller. In this embodiment of the portable blender, the components of the power safety mechanism are associated with handle 2006.

With reference to FIGS. 22B and 23, operation of the portable blender may be affected by an alternate activation button 2306 associated with the motor subunit 2002. In this case, an active state may be achieved by pressing the alternate activation button 2306. This pressing causes the backside of the alternate activation button 2306 to engage and set an alternate power switch 2210 located on the printed circuit board 2110 to an active, closed position. Closing the alternate power switch 2210 electrically couples the motor 2130 with the power subunit 2102, thereby providing power to the motor and turning the blender on.

The alternate power switch 2210 may be a momentary switch, in which case the alternate activation button 2306 is continually pressed to keep the blender in an active state. The portable blender may be returned to an inactive state by releasing the alternate activation button 2306. This releasing causes the backside of the alternate activation button 2306 to disengage from the alternate power switch 2210, to thereby open the power switch. Opening the alternate power switch 2210 electrically decouples the motor 2130 from the power subunit 2102, thereby removing power from the motor and turning the blender off. In another configuration, the alternate power switch 2210 may be a toggle switch, in which case the alternate activation button 2306 may be released after turning the blender on, and the blender will remain on until the alternate activation button is pressed again.

With reference to FIGS. 20-22B, the insert portion 2112 of the handle 2006 includes rails 2212a, 2212b like the rails described with respect to FIGS. 9A-10C. The handle 2006 is thus configured to be attached and detached from the container body 2010 in the same manner described above with reference to FIGS. 14-17.

In summary, disclosed is a portable blender set that includes a handle 110, 2006 having at least one first attachment structure 920a, 2212a, an activation button 204, 2008, and a power activation member 902, 2132 positioned for mechanical engagement with the activation button and a power switch 1102, 2134. The blender set also includes a container body 102, 2010 with at least one second attachment structure 1404a, 2014. The at least one first attachment structure 920a, 2212a and at least one second attachment structure 1404a, 2014a are configured to engage each other to attach the handle 110, 2006 to the container body 102, 2010 and to disengage each other to detach the handle from the container body. The blender set further includes a container base 104, 2124 configured for detachable engagement with the container body 102, 2010.

In one configuration shown in FIG. 2, the blender set further includes a motor subunit 114 configured for detachable engagement with the container base 104, and a power subunit 116 configured for detachable engagement with the motor subunit. In this configuration, the motor subunit 114 includes the power switch 1102 and attachment of the handle 110 through engagement of the first attachment structure 2212a and the second attachment structure 2014a positions or aligns the power activation member for mechanical engagement with the power switch through one or more mechanical structures 310, 402 of one or more of the container base and the motor subunit.

In another configuration shown in FIG. 20, the blender set further includes a motor subunit 2002 configured for detachable engagement with the container base 2124, and a power subunit 2102 that is included in the handle. In this configuration, the handle 2006 includes the power switch and attachment of the handle through engagement of the first attachment structure 2212a and the second attachment structure 2014a establishes an electrical engagement, e.g., interconnection, between the power subunit 2102 and the power switch 2134 in the handle and the motor subunit 2110.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f), unless the element is expressly recited using the phrase "means for" or, in the case of a method claim, the element is recited using the phrase "step for."

What is claimed is:

1. A portable blender set, comprising:
    a handle having at least one first attachment structure, an activation button, and a power activation member positioned for mechanical engagement with each of the activation button and a power switch; and
    a container body having at least one second attachment structure,
    wherein the at least one first attachment structure and at least one second attachment structure are configured to engage each other to attach the handle to the container body, and to disengage each other to detach the handle from the container body;
    the handle has a length and the at least one first attachment structure comprises a rail extending at least partially along the length, and
    the container body has a top, a bottom, and a length extending from the bottom to the top and the at least one second attachment structure comprises a rail receptor extending from the bottom of the container body toward the top of the container body along a majority of the length of the container and having an opening configured to receive the rail.

2. The portable blender set of claim 1, further comprising a container base configured for detachable engagement with the bottom of the container body, and configured to block the opening of the rail receptor when the container base is engaged with the container body to thereby retain the rail within the rail receptor.

3. The portable blender set of claim 1, wherein the at least one first attachment structure comprises a snap-fit projection and the at least one second attachment structure comprises a snap-fit receptor configured to receive the snap-fit projection.

4. The portable blender set of claim 1, further comprising a container base configured for detachable engagement with the container body.

5. The portable blender set of claim 4, further comprising:
    a motor subunit configured for detachable engagement with the container base; and
    a power subunit with a top surface configured for detachable engagement with a bottom surface of the motor subunit.

6. The portable blender set of claim 5, wherein the motor subunit includes the power switch and attachment of the handle through engagement of the first attachment structure and the second attachment structure positions the power activation member for mechanical engagement with the power switch through one or more mechanical structures of one or more of the container base and the motor subunit.

7. The portable blender set of claim 4, further comprising: a motor subunit configured for detachable engagement with the container base; and a power subunit included in the handle.

8. The portable blender set of claim 7, wherein the handle includes the power switch and attachment of the handle through engagement of the first attachment structure and the second attachment structure establishes an electrical engagement between the power subunit and the power switch in the handle and the motor subunit.

9. The portable blender set of claim 1, further comprising an insert configured to attach to the at least one second attachment structure of the container body in place of the handle.

10. A portable blender, comprising:
a power subunit;
a motor subunit;
a container unit removably coupled to the motor and power subunits, the container unit including a container body and a detachable handle removably coupled to the container body;
  a power safety mechanism at least partially associated with the container unit, and configured to transition between an enabled state during which the blender may be turned on, and a disabled state during which the blender cannot be turned on; and
  a power activation mechanism at least partially associated with the detachable handle, and configured to transition between an on state, which is sufficient to cause power to be supplied to the blender and turn the blender on, provided the power safety mechanism is in the enabled state, and an off state during which the blender is off, the power activation mechanism operable to mechanically actuate a power switch located in one of the power subunit or motor subunit.

11. The portable blender of claim 10, wherein:
the power safety mechanism comprises a power safety member associated with the container unit and having a first end and a second end, and a safety switch configured to transition between an open state and a closed state, wherein the power safety member is positioned for mechanical engagement with the safety switch at the second end and extends through the container unit at the first end.

12. The portable blender of claim 11, wherein the safety switch is associated with one of the motor subunit and the container unit.

13. The portable blender of claim 10, wherein:
the power activation mechanism comprises an activation button associated with the container unit, a power activation member associated with the container unit and having a first end and a second end, and a power switch configured to transition between an open state and a closed state, wherein the power activation member is positioned for mechanical engagement with the power switch at the second end and the activation button at the first end.

14. The portable blender of claim 13, wherein the power switch is associated with one of the motor subunit and the container unit.

15. A portable blender set, comprising:
a handle having at least one first attachment structure, an activation button, and a power activation member positioned for mechanical engagement with each of the activation button and a power switch; and
a container body having at least one second attachment structure,
wherein the at least one first attachment structure and at least one second attachment structure are configured to engage each other to attach the handle to the container body, and to disengage each other to detach the handle from the container body, and further comprising
an insert configured to attach to the at least one second attachment structure of the container body in place of the handle.

* * * * *